United States Patent
Nakamura et al.

(10) Patent No.: US 10,951,793 B2
(45) Date of Patent: Mar. 16, 2021

(54) IMAGING DEVICE, IMAGING METHOD, AND IMAGE PROCESSING DEVICE GENERATING A COMPLEX SENSOR IMAGE

(71) Applicant: HITACHI, LTD., Tokyo (JP)

(72) Inventors: Yusuke Nakamura, Tokyo (JP); Kazuyuki Tajima, Tokyo (JP); Keita Yamaguchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 44 days.

(21) Appl. No.: 16/278,857

(22) Filed: Feb. 19, 2019

(65) Prior Publication Data
US 2019/0268507 A1    Aug. 29, 2019

(30) Foreign Application Priority Data
Feb. 27, 2018 (JP) ............................... JP2018-33062

(51) Int. Cl.
*H04N 5/217*    (2011.01)
*G02B 27/60*    (2006.01)
*H04N 5/232*    (2006.01)

(52) U.S. Cl.
CPC ............ *H04N 5/217* (2013.01); *G02B 27/60* (2013.01); *H04N 5/232122* (2018.08)

(58) Field of Classification Search
CPC ............ H04N 5/217; H04N 5/232122; H04N 5/23229; H04N 5/2254; H04N 5/23212; H04N 5/2253; G02B 27/60; G06T 1/0007

USPC .......................................................... 348/340
See application file for complete search history.

(56) References Cited

U.S. PATENT DOCUMENTS

2002/0176002 A1\* 11/2002 Kawada ................. H04N 17/00
                                           348/192

FOREIGN PATENT DOCUMENTS

| JP | WO2016203573 | \* 12/2016 |
|----|---|---|
| WO | 2016203573 A1 | 12/2016 |
| WO | 2017/145348 A1 | 8/2017 |
| WO | 2017/149687 A1 | 9/2017 |

OTHER PUBLICATIONS

Chinese Office Action dated Aug. 6, 2020 issued in corresponding Chinese Patent Application No. 201910035165.5.

\* cited by examiner

*Primary Examiner* — Lin Ye
*Assistant Examiner* — Chan T Nguyen
(74) *Attorney, Agent, or Firm* — Mattingly & Malur, PC

(57) ABSTRACT

An imaging device includes: a modulator configured to modulate the intensity of light, based on a grating pattern; an image sensor configured to convert light passing through the modulator to electrical signals to generate a sensor image; a complex sensor image processing unit configured to generate, from the sensor image, a complex sensor image comprising a complex number; and a data transmission unit configured to transmit the complex sensor image.

15 Claims, 34 Drawing Sheets

PATTERN 801 FOR RECONSTRUCTION

IMAGING DEVICE, IMAGING METHOD, AND IMAGE PROCESSING DEVICE GENERATING A COMPLEX SENSOR IMAGE

This application claims the priority based on the Japanese Patent Application No. 2018-33062 filed on Feb. 27, 2018. The entire contents of which are incorporated herein by reference for all purpose.

BACKGROUND

Technical Field

The present invention relates to an imaging device, an imaging method, and an image processing system.

Related Art

As related art in the present technical field, there is International Publication No. 2017/149687. The publication mentions: "providing an imaging device which facilitates the detection of the incidence angle of light beams passing through a grid substrate, thereby making it possible to enhance the functions of the imaging device; and making it possible to provide a solution by means of an imaging device including an image sensor configured to convert an optical image captured in a plurality of pixels arranged in an array form at an imaging surface, to image signals, and output the image signals, a modulator provided on a light-receiving surface of the image sensor and configured to modulate the intensity of light, an image storage unit configured to temporarily store image signals output from the image sensor, and a signal processing unit configured to apply image processing to image signals output from the image storage unit, characterized in that the modulator has a first grating pattern composed of multiple concentric circles, and the signal processing unit modulates the image signals output from the image storage unit in accordance with an imaginary second grating pattern composed of multiple concentric circles, thereby generating a moire fringe image, and change the concentric circles of the second grating pattern in size depending on the focus position".

SUMMARY

Lensless imaging devices which use no lens are expected as imaging devices which can achieve small sizes and low costs. In addition, network connections for imaging devices have been becoming indispensable for the expanded range of application of imaging devices, such as image analyses. However, the International Publication No. 2017/149687 described above mentions a method for achieving functions such as focus adjustment (refocusing), auto focus, and ranging during the generation of moire fringe images from sensor images taken by a lensless imaging device. In addition, International Publication No. 2017/145348 discloses a technology of noise removal by the arrangement of gratings such that the phase of the grating at the surface and the phase of the grating at the back surface are overlapped with each other in all combinations independently of each other. However, in the case of attempting to make a focus adjustment or the like again for an image obtained by imaging, there will be enormous arithmetic processing, because there is a need to execute again the multiplication by a pattern for reconstruction and the arithmetic processing for noise removal.

An object of the present invention is to reduce arithmetic processing in attempting to make a focus adjustment or the like after shooting, and then provide a technology which is suitable for transmitting a sensor image of a lensless imaging device, and then achieving various functions.

The present application encompasses more than one means for solving at least part of the problem mentioned above, and an example of the means will be given as follows.

An imaging device according to an aspect of the present invention includes: a modulator configured to modulate the intensity of light, based on a grating pattern; an image sensor configured to convert light passing through the modulator to electrical signals to generate a sensor image; a complex sensor image processing unit configured to generate, from the sensor image, a complex sensor image comprising a complex number; and a data transmission unit configured to transmit the complex sensor image.

According to the present invention, the processing is simplified to reduce the amount of communication data, thereby making it possible to provide a technology which is suitable for transmitting a sensor image of a lensless imaging device, and then achieving various functions.

Objects, configurations, and advantageous effects other than the foregoing will be evident from the following description of embodiments.

DETAILED DESCRIPTION

Figure 1:
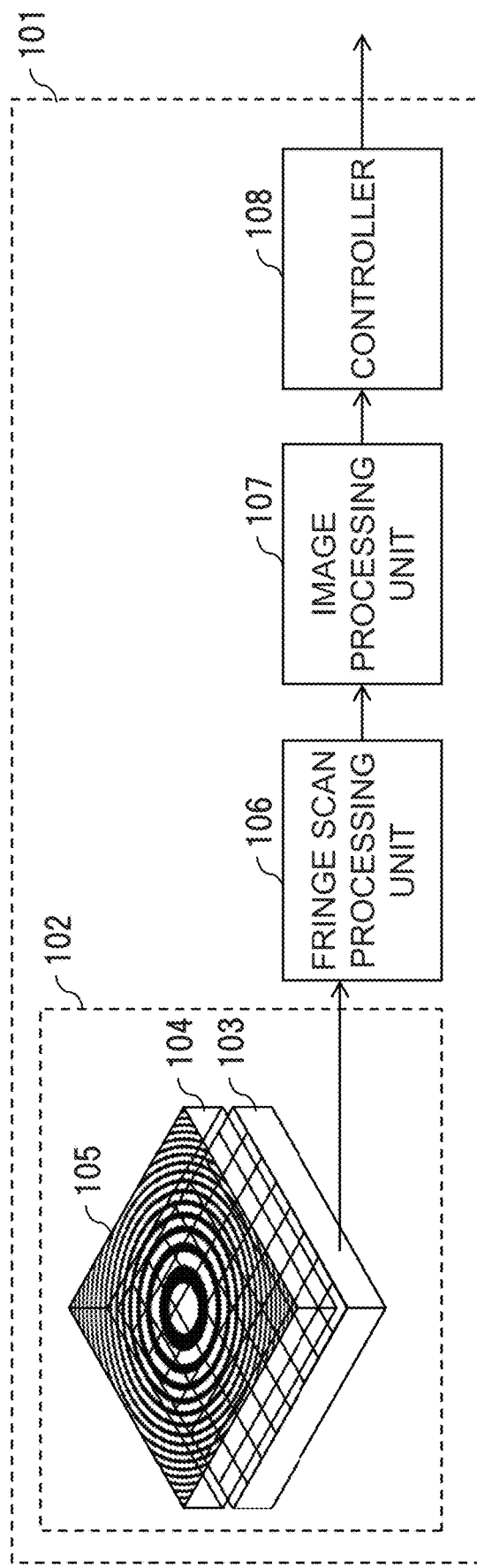
FIG. 1 is a diagram illustrating a configuration example of an imaging device according to a first embodiment.

In the following embodiments, explanations will be given which are divided into multiple sections or embodiments, if necessary, for the sake of convenience. However, unless expressly stated otherwise, the sections or embodiments are not to be considered independent of one another, but one section or embodiment has a relation partially or entirely with the other, such as modification examples, details, and supplemental explanations.

In addition, in the following embodiments, in the case of referring to the numbers (including numbers, numerical values, amounts, ranges, and the like) of elements, the numbers are not to be considered limited to any specific number, unless expressly stated otherwise, and unless obviously limited to the specific numbers in principle, but may be the specific numbers or more, or less.

Furthermore, in the following embodiments, obviously, the constituent elements (also including elemental steps) are not necessarily to be considered indispensable, unless expressly stated otherwise, and unless considered obviously indispensable in principle.

Likewise, in the following embodiments, in the case of referring to the shapes, positional relationship, and the like of the constituent elements, the shapes and the like are considered including equivalents substantially approximate or similar to the shapes and the like, unless expressly stated otherwise, and unless obviously excluded in principle. The same applies to the numerical values and ranges mentioned above.

In addition, throughout all of the drawings for the explanation of embodiments, the same members are denoted by the same reference numerals in principle, and repeated descriptions thereof will be omitted. Respective embodiments of the present invention will be described below with reference to the drawings.

First Embodiment

<Shooting Principle for Object at Infinity>

FIG. 1 is a diagram illustrating a configuration example of an imaging device 101 according to a first embodiment. The imaging device 101 is adapted to capture an image of an external object without using any lens for imaging, and composed of an imaging unit 102, a fringe scan processing unit 106 (which may be referred to also as a complex sensor image processing unit), an image processing unit 107, and a controller 108.

Figure 2:
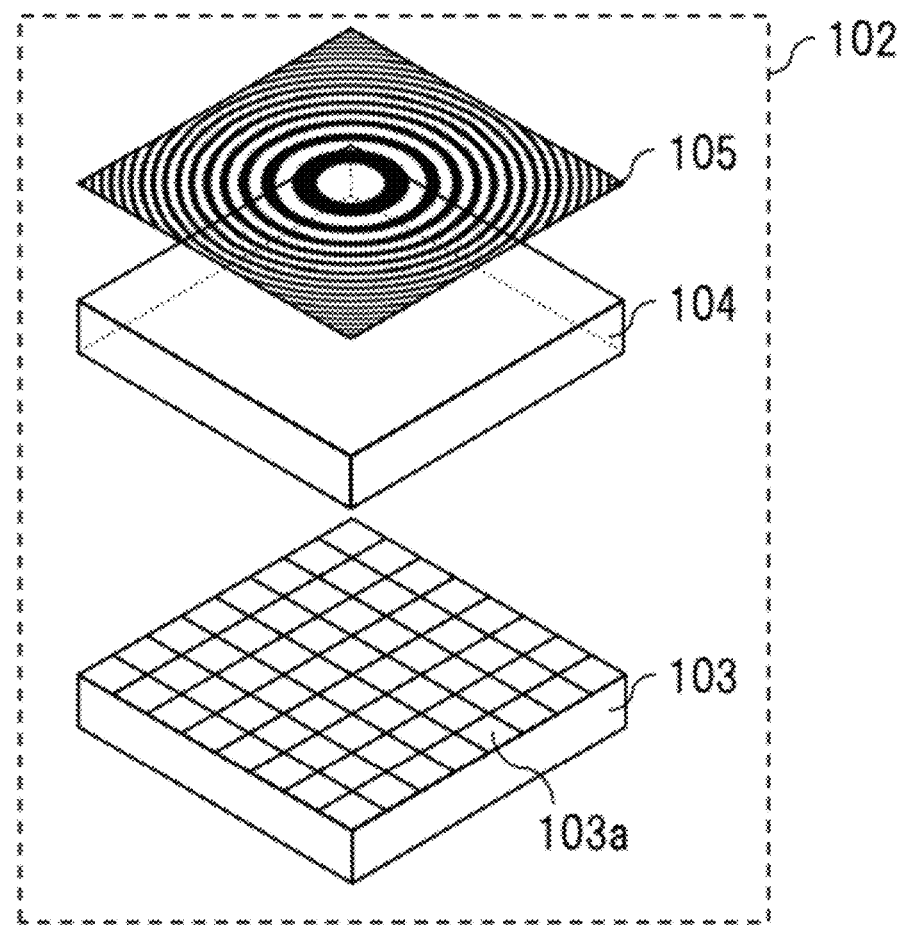
FIG. 2 is a diagram illustrating a configuration example of an imaging unit.

FIG. 2 is a diagram illustrating a configuration example of the imaging unit 102. The imaging unit 102 is composed of an image sensor 103, a pattern substrate 104, and a real pattern 105. The pattern substrate 104 and the real pattern 105 can be collectively referred to as a modulator.

The pattern substrate 104 is fixed in close contact with the light-receiving surface of the image sensor 103, and the real pattern 105 is formed on a surface of the pattern substrate 104. The pattern substrate 104 is made of a material that is transparent to visible light, for example, such as glass or plastic.

The real pattern 105 is formed by vapor deposition of a metal such as aluminum and chromium through, for example, a sputtering method or the like which is used for semiconductor processes. A contrast is formed by a pattern with aluminum or the like vapor-deposited and a pattern without aluminum vapor-deposited.

It is to be noted that the real pattern 105 is not to be considered limited to the vapor deposition, but for example, the contrast may be formed by any means as long as the means can achieve transmission modulation, such as, for example, by printing or the like with an ink-jet printer or the like.

In addition, although visible light has been cited as an example herein, for example, in the case of shooting with far-infrared rays, the pattern substrate 104 is made of, for example, a material that is transparent to far-infrared rays, for example, such as germanium, silicon, or chalcogenide. More specifically, a material that is transparent to a wavelength intended for shooting can be used for the pattern substrate 104, whereas a material that blocks the wavelength intended for shooting can be used for the real pattern 105.

Figure 3:
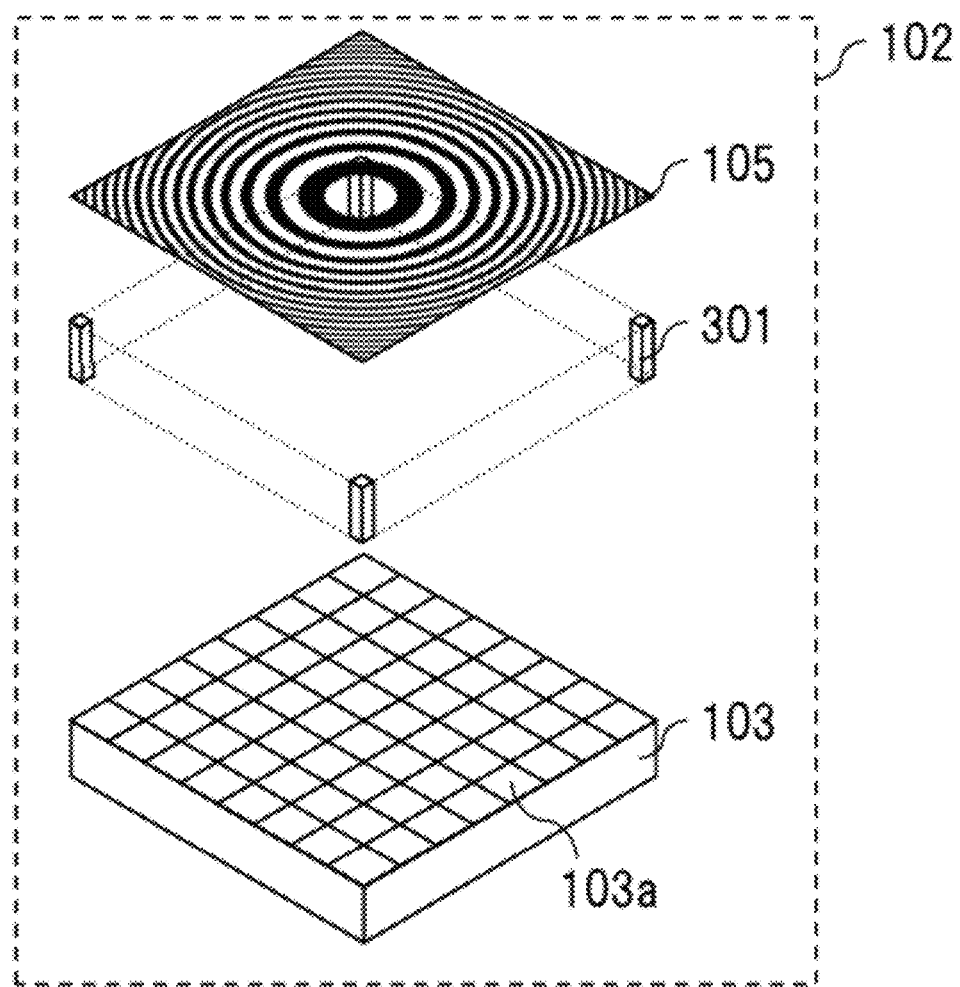
FIG. 3 is a diagram illustrating another configuration example of the imaging unit.

In addition, the method of forming the real pattern 105 on the pattern substrate 104 has been described herein, but the invention is not limited thereto. FIG. 3 is a diagram illustrating another configuration example of the imaging unit 102. The imaging unit 102 can be also achieved by a configuration in which a real pattern 105 is formed in a thin film, and held by supporting members 301 provided instead of the pattern substrate 104. The supporting members 301 and the real pattern 105 can be collectively referred to as a modulator. It is to be noted that in the imaging device 101 shown in FIG. 1, the angle of view for shooting can be changed depending on the thickness of the pattern substrate 104. Therefore, as long as the supporting members 301 shown in FIG. 3 have the function of being capable of changing the lengths thereof, the angle of view for shooting can be changed.

As shown in FIG. 2 or 3, the image sensor 103 is composed of, for example, a CCD (Charge Coupled Device) image sensor, a CMOS (Complementary Metal Oxide Semiconductor) image sensor, or the like. The imaging surface (light-receiving surface) of the image sensor 103 has pixels 103a as light-receiving elements arranged in an array form. The light intensity of light that passes through the real pattern 105 is modulated by the grating pattern, and the light is received by the image sensor 103. The image sensor 103 converts optical images received by the pixels 103a to image signals as electrical signals, and outputs the signals. It is to be noted that image signals (analog image data) are converted to digital signals, for example, through an analog-digital conversion circuit, and output as digital image data. In this specification, an explanation is given for the imaging unit 102 adapted to output image data.

The fringe scan processing unit 106 applies fringe scan to remove noise from the image data output from the image sensor 103, and outputs the image data subjected to the noise removal, to the image processing unit 107. The image processing unit 107 applies predetermined image processing to the image data output from the fringe scan processing unit 106, and outputs the image data subjected to the image processing, to the controller 108. The controller 108 converts the data format of the image data output from the image processing unit 107, if necessary, and stores the data in a memory device (not shown) provided in the imaging device 101, or outputs the data to an external host computer or a recording medium.

It is to be noted that the controller 108 can be achieved by, for example, a unit including a processor, a memory, a communication device, a processing circuit, or the like. In addition, the controller 108 may be connected to or provided with an input-output interface connected to an external device, such as a USB (Universal Serial Bus) or a HDMI (High-Definition Multimedia Interface), for example. The fringe scan processing unit 106 and the image processing unit 107 are achieved by, for example, image processing circuits. The fringe scan processing unit 106, the image processing unit 107, and the controller 108 may be configured integrally.

Next, the shooting principle in the imaging device 101 will be described.

First, the real pattern 105 is a concentric grating pattern with a pitch made fine in inverse proportion to the radius from the center, and defined as follows with the use of a radius r from the reference coordinate as the center of the concentric circle and a coefficient $\beta$:

[Mathematical Formula 1]

$$I(r)=1+\cos \beta r^2 \quad (1)$$

The real pattern 105 shall have a transmission modulated in proportion to the foregoing formula.

Figure 4:
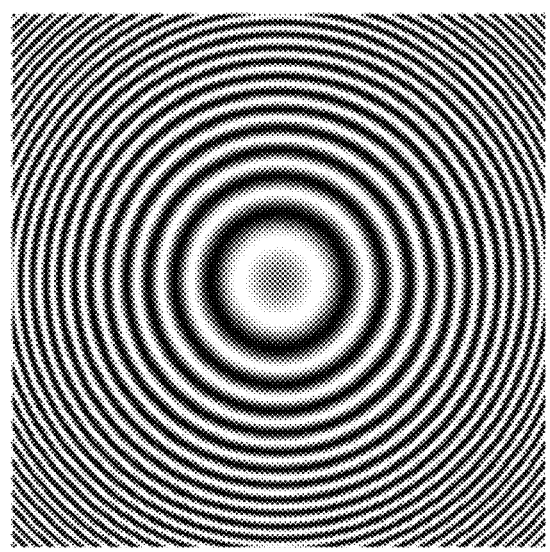
FIG. 4 is a diagram illustrating an example of a real pattern.
Figure 5:
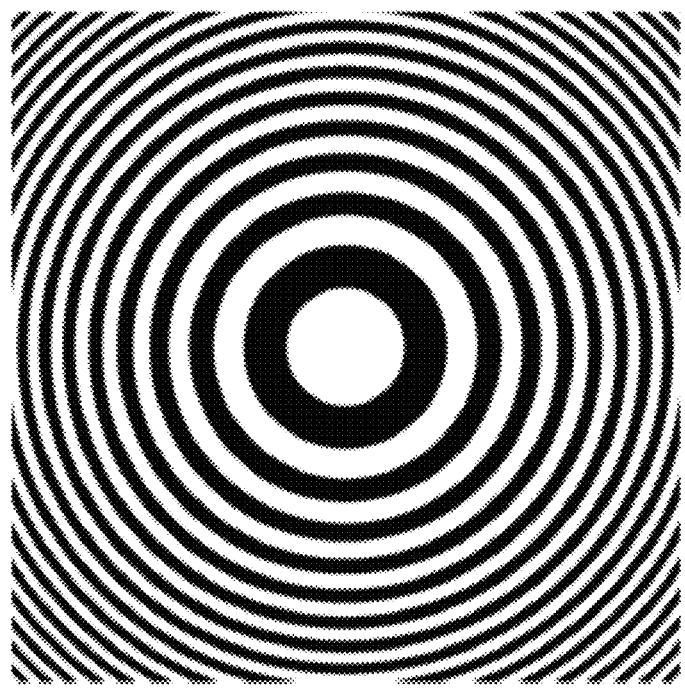
FIG. 5 is a diagram illustrating another example of a real pattern.

The plate with such a fringe is referred to as Gabor Zone Plate or Fresnel Zone Plate. FIG. 4 is a diagram illustrating an example of the real pattern 105, which shows a Gabor Zone Plate in accordance with the formula (1). FIG. 5 is a diagram illustrating another example of the real pattern 105, which shows a Fresnel Zone Plate obtained by binarizing the formula (1) with a threshold value 1.

Hereinafter, for the sake of simplification, an explanation for only the x-axis direction will be given with mathematical formulas, but also considering the y-axis direction as well makes it possible to see two-dimensional deployment.

Figure 6:
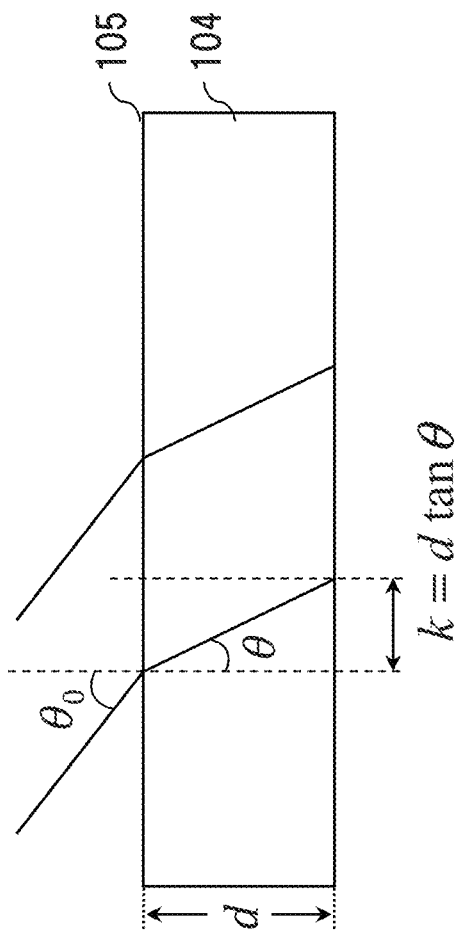
FIG. 6 is a diagram for explaining an in-plane shift produced for a shadow from a pattern substrate surface to an image sensor with oblique incident parallel light.

FIG. 6 is a diagram for explaining an in-plane shift produced for a shadow from the pattern substrate surface to the image sensor with oblique incident parallel light. Assume that parallel light enters at an angle $\theta_0$ in the x-axis direction onto the pattern substrate 104 of d in thickness with the real pattern 105 formed. In a geometric optical manner, where the refraction angle in the substrate 104 is denoted by $\theta$, light multiplied by the transmission of the grating at the surface enters the image sensor 103, just with a k=d·tan $\theta$ shift. In this case, a shadow with the following intensity distribution is detected on the image sensor 103:

[Mathematical Formula 2]

$$I_F(x)=1+\cos[\beta(x+k)^2+\Phi] \quad (2)$$

Figure 7:
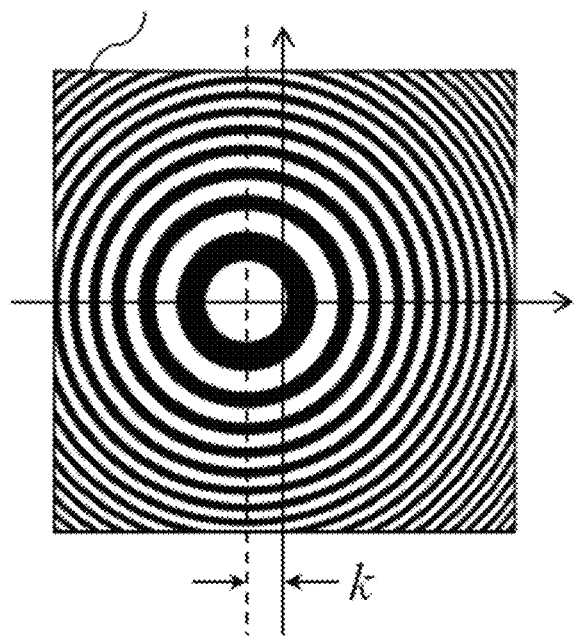
FIG. 7 is a diagram illustrating an example of a shadow of a real pattern.

It is to be noted that $\Phi$ represents an initial phase of a transmission distribution in accordance with the formula (1). This shadow (FIG. 7) of the real pattern 105 is projected, with a k shift, as in the formula (2). This image corresponds to the output of the imaging unit 102.

Next, reconstruction achieved by a correlation reconstruction method and a moire reconstruction method will be described as for the processing in the image processing unit 107.

Figure 8:
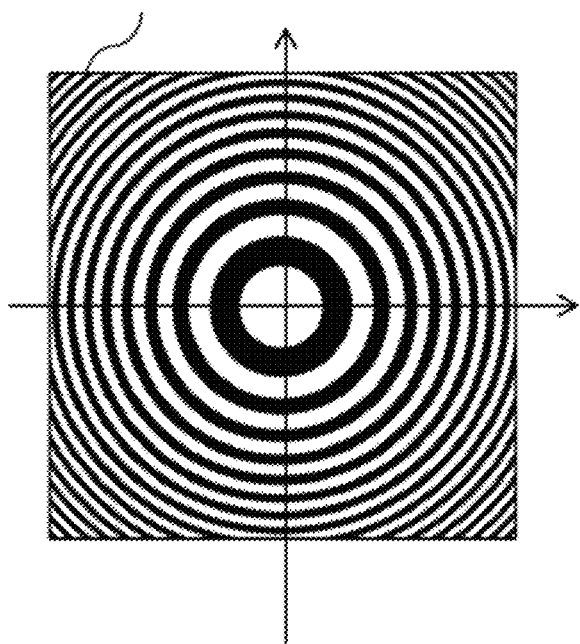
FIG. 8 is a diagram illustrating an example of a pattern for reconstruction.
Figure 9:
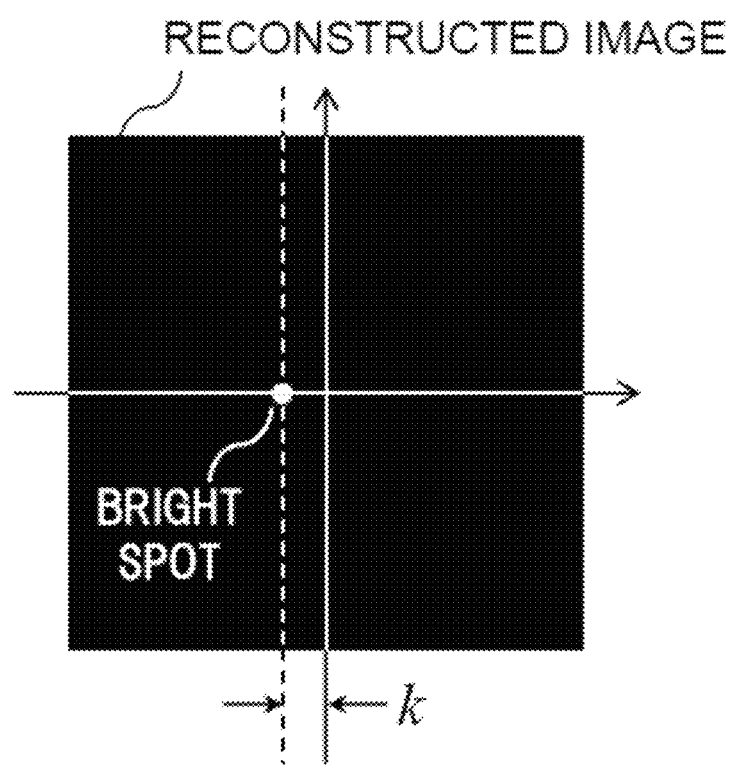
FIG. 9 is a diagram illustrating an example of an image reconstructed by a correlation reconstruction method.

The correlation reconstruction method is adapted such that a cross-correlation function between the shadow (FIG. 7) of the real pattern 105 and a pattern 801 for reconstruction (FIG. 8) is computed, thereby providing a bright spot with a shift amount of "k" (FIG. 9). It is to be noted that typically, the operation quantity will be increased if the cross-correlation operation is performed in accordance with a two-dimensional convolution operation. Thus, the principle of an operation example through the use of Fourier transform will be described with reference to mathematical formulas.

First, Gabor Zone Plate or Fresnel Zone Plate is used for the pattern 801 for reconstruction as well as the real pattern 105. Therefore, the pattern 801 for reconstruction can be expressed as follows with the use of the initial phase $\Phi$:

[Mathematical Formula 3]

$$I_B(x)=\cos(\beta x^2+\Phi) \quad (3)$$

The pattern 801 for reconstruction is generated as imaginary data and then used in arithmetic processing that is executed by the image processing unit 107, and thus not required to be offset with 1 as in the formula (1), and may have a negative value without any problem.

The Fourier transform of the formulas (2) and (3) respectively provide results as follows:

[Mathematical Formula 4]

$$\mathcal{F}[I_F(x)] = \delta(u) + \frac{e^{-iku}}{2\sqrt{\pi\beta}}\sin\left(\frac{u^2}{4\beta}-\Phi+\frac{\pi}{4}\right) \quad (4)$$

[Mathematical Formula 5]

$$\mathcal{F}[I_B(x)] = \frac{1}{2\sqrt{\pi\beta}}\sin\left(\frac{u^2}{4\beta}-\Phi+\frac{\pi}{4}\right) \quad (5)$$

In this regard, F, u, and $\delta$ with brackets respectively represent a Fourier transform operation, a frequency coordinate in the x direction, and a delta function. What is important for the foregoing formulas is that the Fourier transformed formulas also represent Fresnel Zone Plate or Gabor Zone Plate. Therefore, the Fourier transformed pattern 801 for reconstruction may be directly generated on the basis of the foregoing formulas. This direct generation makes it possible to reduce the operation quantity.

Next, the multiplication of the formula (4) by the formula (5) provides the following:

[Mathematical Formula 6]

$$\mathcal{F}[I_F(x)] \cdot \mathcal{F}[I_B(x)] = \frac{1}{2\sqrt{\pi\beta}}\sin\left(\frac{\pi}{4} - \Phi\right)\delta(u) + \frac{e^{-iku}}{4\pi\beta} \cdot \left[\sin^2\left(\frac{u^2}{4\beta} - \Phi + \frac{\pi}{4}\right)\right] \quad (6)$$

The term "exp(-iku)" represented by the foregoing exponential function refers to a signal component, and the Fourier transform of the term provides a result as follows:

[Mathematical Formula 7]

$$\mathcal{F}^{-1}[e^{-iku}] = 2\pi\delta(x+k) \quad (7)$$

from which a bright spot can be obtained in the location of "k" on the original x axis. This bright spot indicates a light flux at infinity, which refers to nothing more or less than a shot image from the imaging device 101 in FIG. 1.

It is to be noted that the correlation reconstruction method may be achieved with a pattern that is not limited to Fresnel Zone Plate or Gabor Zone Plate, for example, a random pattern, as long as the autocorrelation function of the pattern has a single peak.

Figure 10:
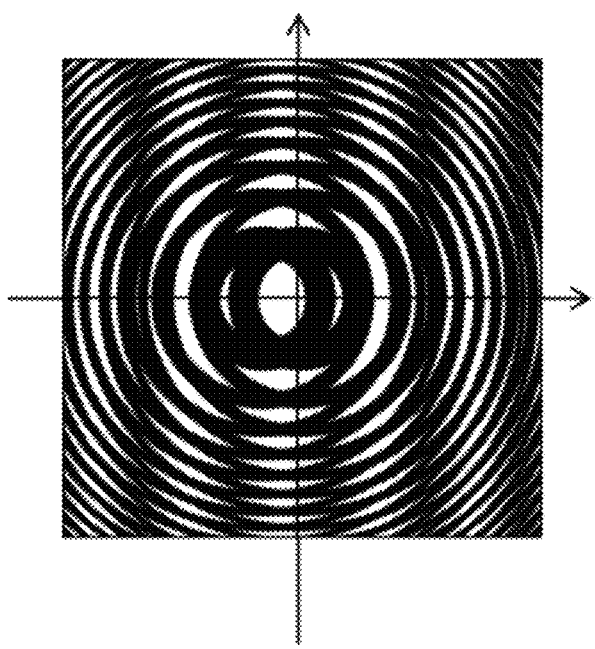
FIG. 10 is a diagram illustrating an example of a moire fringe according to a moire reconstruction method.
Figure 11:
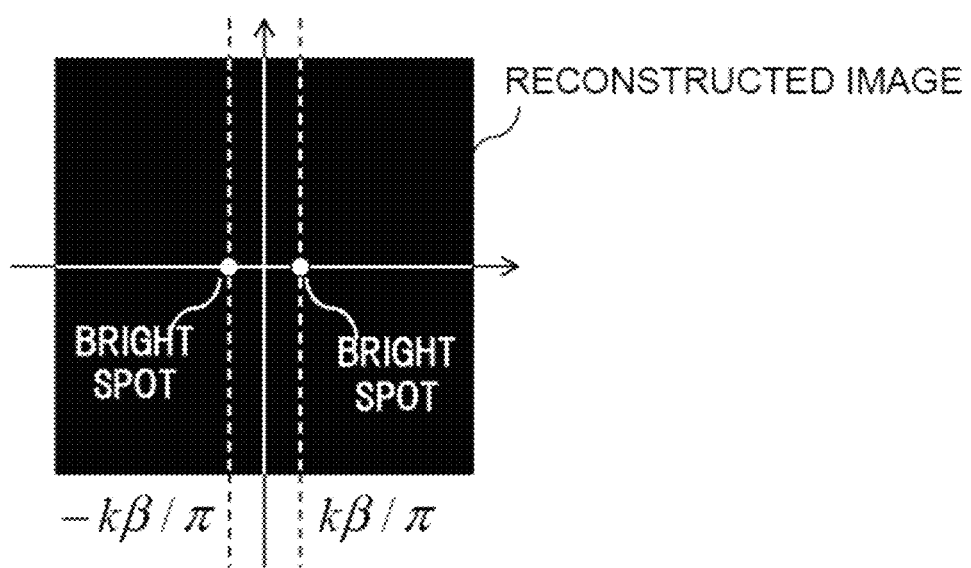
FIG. 11 is a diagram illustrating an example of an image reconstructed by a moire reconstruction method.

Next, the moire reconstruction method multiplies the shadow (FIG. 7) of the real pattern 105 by the pattern 801 for reconstruction (FIG. 8) to generate a moire fringe (FIG. 10), and applies a Fourier transform to the moire fringe, thereby providing bright spots with a shift amount of "kβ/π" (FIG. 11) in a reconstructed image. This moire fringe is expressed by the following mathematical formula:

[Mathematical Formula 8]

$$I_F(x) \cdot I_B(x) = \{1+\cos[\beta(x+k)^2+\Phi]\}\cos(\beta x^2+\Phi) = \frac{1}{2}[2\cos(\beta x^2+\Phi)+\cos(2\beta x^2+2k\beta x+2\beta k^2+2\Phi)+\cos(2k\beta x+\beta k^2)] \quad (8)$$

The third term of the foregoing expansion formula corresponds to a signal component, and it is determined that equally spaced fringes that are straight in a direction in which the two patterns are shifted are created over the entire region where the two patterns have an overlap with each other. This fringe produced at a relatively low spatial frequency by the overlap between the fringes is referred to as a moire fringe. The two-dimensional Fourier transform of the third term provides a result as follows:

[Mathematical Formula 9]

$$\mathcal{F}[\cos 2k\beta x] = \delta\left(u + \frac{k\beta}{\pi}\right) + \delta\left(u - \frac{k\beta}{\pi}\right) \quad (9)$$

In this regard, F, u, and δ with brackets respectively represent a Fourier transform operation, a frequency coordinate in the x direction, and a delta function. From the foregoing result, it is determined that the spatial frequency spectrum of the moire fringe has spatial frequency peaks produced in the locations of u=±kβ/π. The bright spots indicate light fluxes at infinity, which refer to nothing more or less than a shot image from the imaging device 101 in FIG. 1.

It is to be noted that the moire reconstruction method may be achieved with a pattern that is not limited to Fresnel Zone Plate or Gabor Zone Plate, for example, an ellipsoidal pattern, as long as the moire fringe obtained by the pattern shift has a single frequency.

<Noise Cancellation>

The explanation has been given while focusing on the signal component in the transform from the formula (6) to the formula (7), and the transform from the formula (8) to the formula (9), but in actuality, the term other than the signal component disturbs reconstruction. Therefore, noise cancellation based on fringe scan is carried out.

Figure 12:
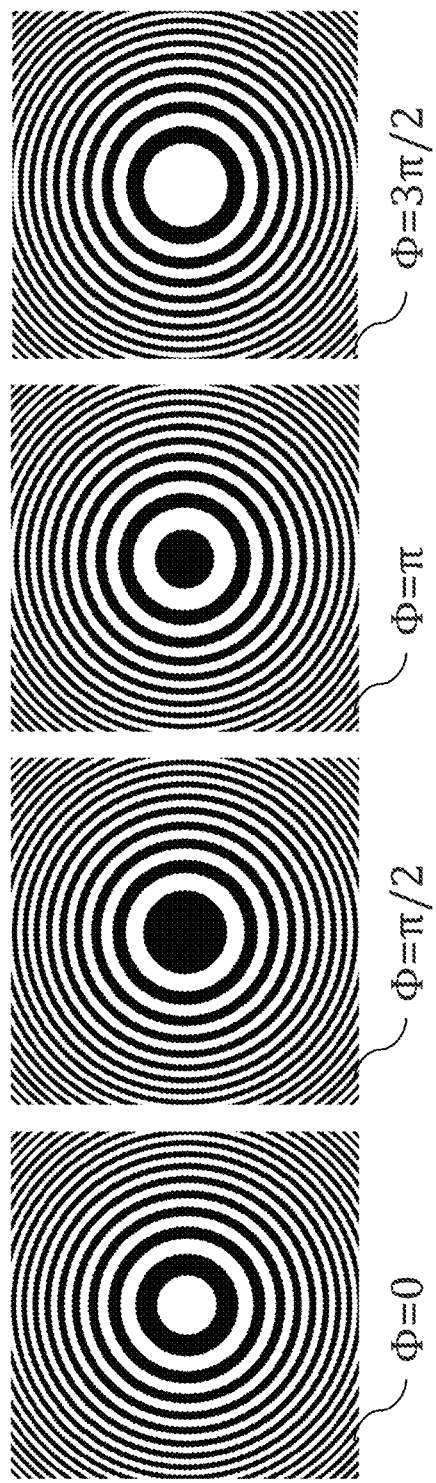
FIG. 12 is a diagram illustrating an example of a combination of initial phases in fringe scan.

For the fringe scan, there is a need to use, as the real pattern 105, multiple patterns that differ in initial phase Φ. FIG. 12 is a diagram illustrating an example of a combination of initial phases in fringe scan. In this case, when sensor images shot with the use of four phases of Φ=0, π/2, π, and 3π/2 are subjected to arithmetic processing in accordance with the following formula, sensor images with complex numbers (complex sensor images) are obtained.

[Mathematical Formula 10]

$$I_{CF}(x) = \frac{1}{2}\sum_{\Phi} I_F(x) \cdot \exp(i\Phi), \Phi \in \{0, \pi/2, \pi, 3\pi/2\} \quad (10)$$

$$= \frac{1}{2}\sum_{\Phi} \{1 + \cos[\beta(x+k)^2 + \Phi]\} \cdot \exp(i\Phi)$$

$$= \exp[i\beta(x+k)^2]$$

In this regard, the complex pattern 801 for reconstruction can be expressed as follows:

[Mathematical Formula 11]

$$I_{CB}(x) = \exp(-i\beta x^2) \quad (11)$$

The pattern 801 for reconstruction, which is used in arithmetic processing, may thus have any complex number without problem. In the case of the moire reconstruction method, the multiplication of the formula (10) by the formula (11) provides a result as follows:

[Mathematical Formula 12]

$$I_{CF}(x) \cdot I_{CB}(x) = \exp[i\beta(x+k)^2] \cdot \exp(-i\beta x^2) = \exp[2i\beta kx + i\beta k^2] \quad (12)$$

The term "exp(2iβkx)" represented by the foregoing exponential function refers to a signal component, and it is determined that noise cancellation is achieved without any unnecessary term produced as in the formula (8).

Likewise, when the correlation reconstruction method is also checked, the Fourier transform of the formula (10) and the formula (11) respectively provide results as follows:

[Mathematical Formula 13]

$$\mathcal{F}[I_{CF}(x)] = \frac{1+i}{2\sqrt{2\pi\beta}}\exp(-iku)\exp\left(-i\frac{u^2}{4\beta}\right) \quad (13)$$

[Mathematical Formula 14]

$$\mathcal{F}[I_{CB}(x)] = -\frac{1+i}{2\sqrt{2\pi\beta}}\exp\left(i\frac{u^2}{4\beta}\right) \quad (14)$$

Next, the multiplication of the formula (13) by the formula (14) provides a result as follows:

[Mathematical Formula 15]

$$\mathcal{F}[I_{CF}(x)] \cdot \mathcal{F}[I_{CB}(x)] = \frac{-i}{4\pi\beta}\exp(-iku) \quad (15)$$

The term "exp(–iku)" represented by the foregoing exponential function refers to a signal component, and it is determined that noise cancellation is achieved without any unnecessary term produced as in the formula (8).

It is to be noted that although the foregoing example has been described with the use of the multiple patterns at the four phases, the initial phase Φ may be set so as to divide the angle from 0 to 2π equally, and not to be considered limited to the four phases.

In order to achieve the foregoing shooting with multiple patterns, there are a method of switching the pattern in a time-division manner (time-division fringe scan) and a method of switching the pattern in a spatial division manner (spatial division fringe scan).

In order to achieve the time-division fringe scan, for example, the real pattern 105 is composed of a liquid crystal display element or the like capable of electrically switching and then displaying the multiple initial phases shown in FIG. 12 (that is, capable of changing the pattern). The imaging unit 102 controls the switching timing of the liquid crystal display element and the shutter timing of the image sensor 103 in synchronization, and the fringe scan processing unit 106 executes a fringe scan operation after the acquisition of four images.

Figure 13:
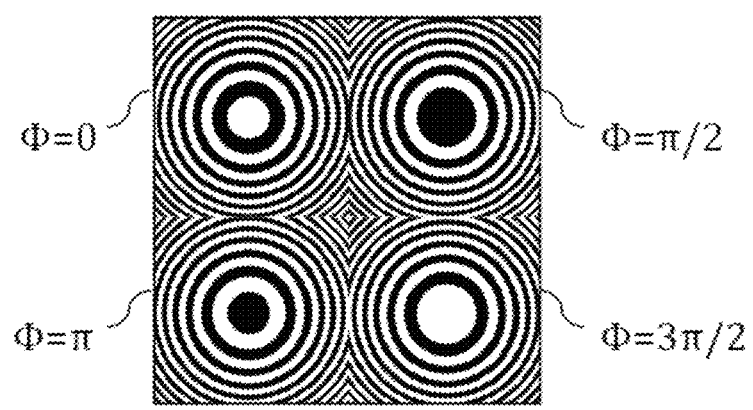
FIG. 13 is a diagram illustrating an example of a real pattern in spatial division fringe scan.

In contrast, in order to achieve the spatial division fringe scan, the real pattern 105 with multiple initial phases is used, for example, as shown in FIG. 13 (a diagram illustrating an example of the real pattern 105 in spatial division fringe scan). The imaging unit 102 controls the shutter timing of the image sensor 103, and the fringe scan processing unit 106 divides, after the acquisition of one image, the acquired image into four corresponding to patterns at the respective initial phases, and executes a fringe scan operation.

Figure 14:
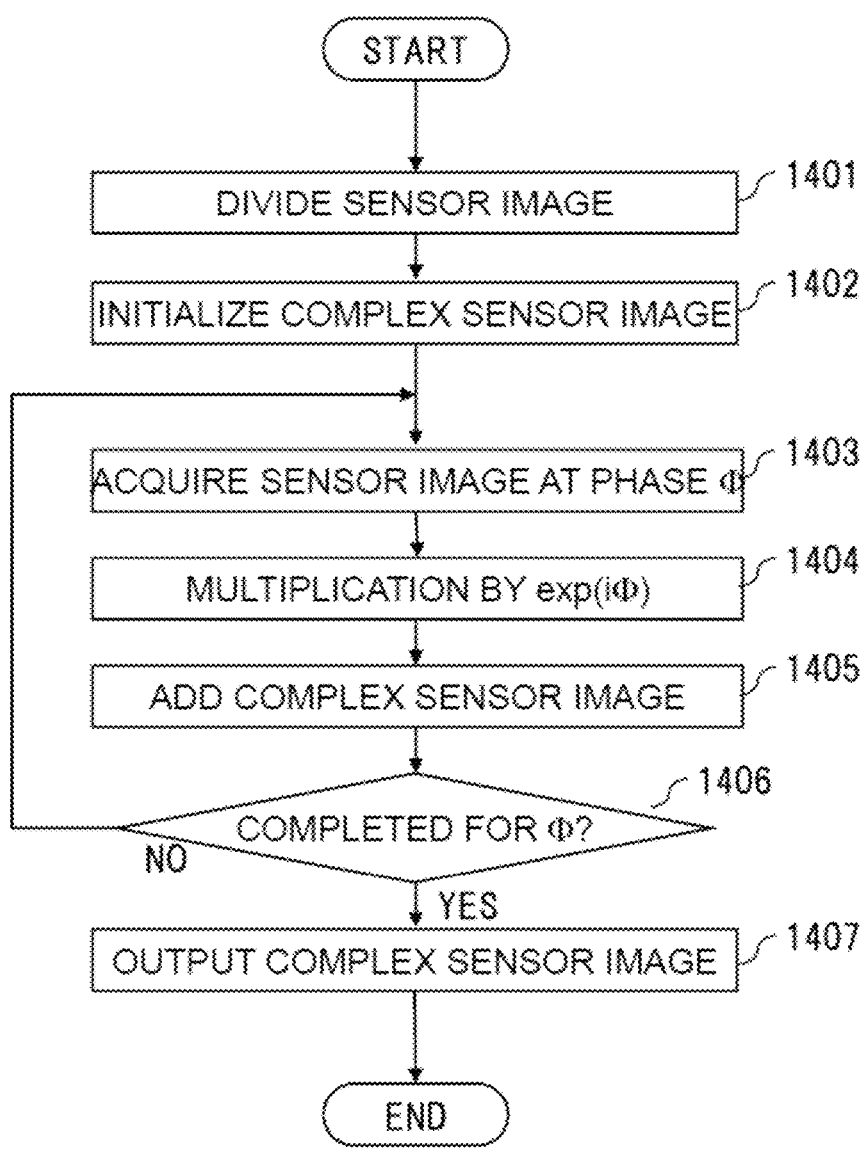
FIG. 14 is a flowchart showing an example of processing executed by a fringe scan processing unit.

Next, the fringe scan operation in the fringe scan processing unit 106 will be described. FIG. 14 is a flowchart showing an example of processing executed by the fringe scan processing unit 106.

First, the fringe scan processing unit 106 acquires sensor image(s) (one image in the case of the spatial division fringe scan or multiple images in the case of the time-division fringe scan) in multiple phase patterns output from the image sensor 103. The fringe scan processing unit 106 divides the acquired sensor image for each phase in the case of using the spatial division fringe scan (1401), or skips the processing 1401 in the case of using the time-division fringe scan. Next, the fringe scan processing unit 106 initializes complex sensor images for output (1402).

Subsequently, the fringe scan processing unit 106 repeats the processing 1403 to processing 1405 for each initial phase. For example, in the fringe scan with the use of the four phases as shown in FIG. 12, the processing is repeated four times at Φ=0, π/2, π, and 3π/2. The fringe scan processing unit 106 acquires a sensor image at the target initial phase Φ (1403), executes the multiplication of the image by exp(iΦ) depending on the initial phase Φ (1404), and adds the multiplication result to the complex sensor image (1405). The fringe scan processing unit 106 determines if the processing is completed for all of the initial phases (1406), and returns the processing to 1403 if the processing is not completed (NO in 1406) or proceeds with the processing to 1407 if the processing is completed (YES in 1406).

Finally, the fringe scan processing unit 106 outputs the complex sensor images (1407). The foregoing processing in the fringe scan processing unit 106 corresponds to the formula (10).

Figure 15:
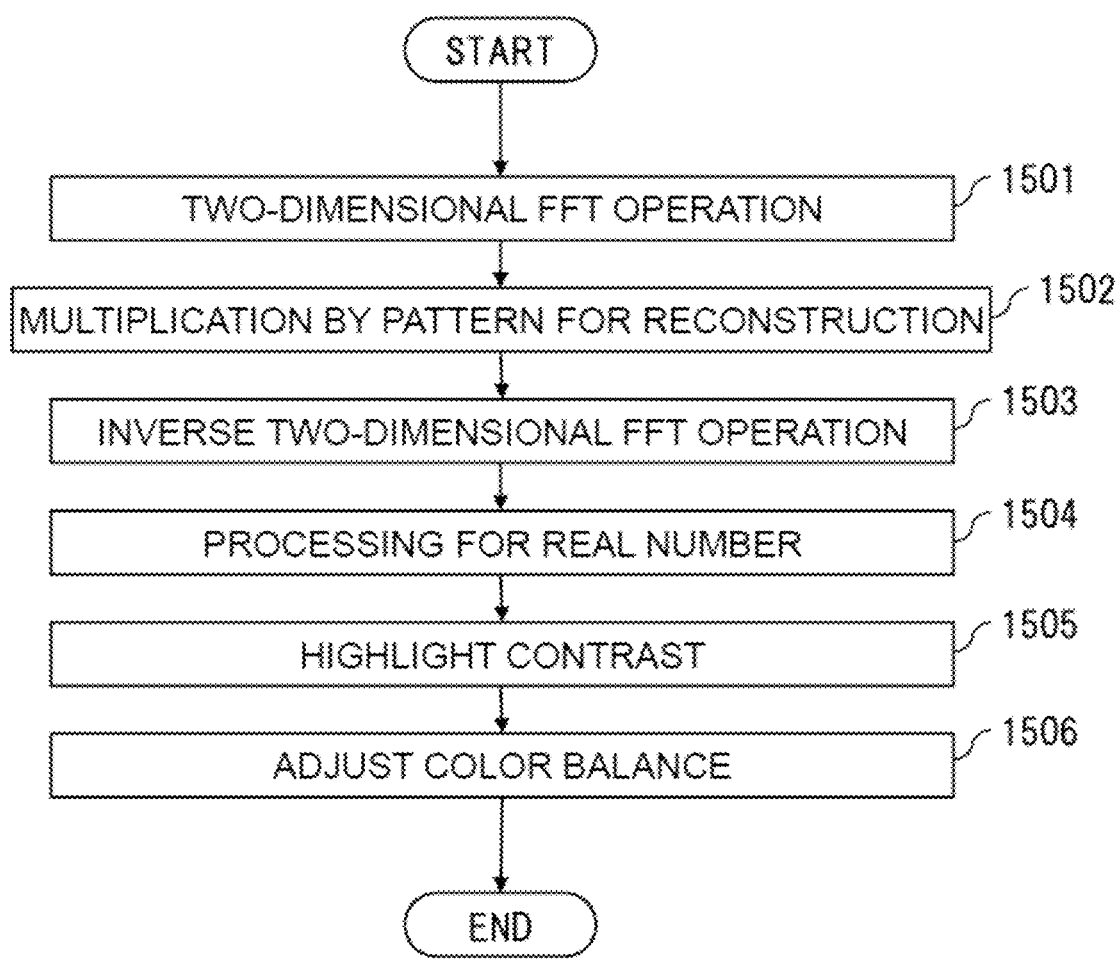
FIG. 15 is a flowchart showing an example of processing executed by an image processing unit according to a correlation reconstruction method.

Next, the image processing in the image processing unit 107 will be described. FIG. 15 is a flowchart showing an example of processing executed by the image processing unit 107 according to the correlation reconstruction method.

First, the image processing unit 107 acquires the complex sensor images output from the fringe scan processing unit 106, and applies a two-dimensional fast Fourier transform (FFT: Fast Fourier Transform) operation to the complex sensor images (1501). Next, the image processing unit 107 generates the pattern 801 for reconstruction for use in processing for reconstruction and multiplies the complex sensor images subjected to the two-dimensional FFT operation by the pattern 801 for reconstruction (1502), and executes an inverse two-dimensional FFT operation (1503). The operation results have complex numbers, and the image processing unit 107 thus obtains the absolute values from the complex numbers or extracts the real parts therefrom to reconstruct (restore), as real numbers, the images to be shot (1504). Thereafter, the image processing unit 107 applies, to the reconstructed image obtained, processing for contrast highlighting (1505), a color balance adjustment (1506), and the like, and outputs the images as shot images. Then, the image processing executed by the image processing unit 107 according to the correlation reconstruction method comes to an end.

Figure 16:
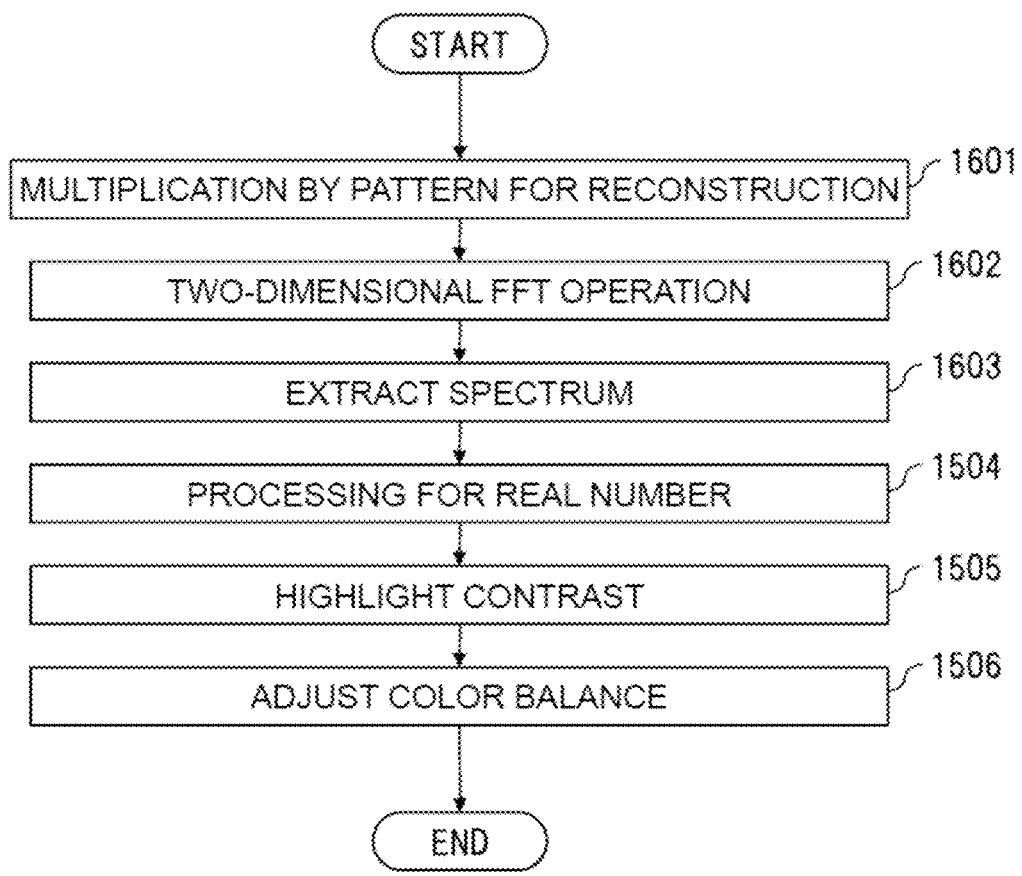
FIG. 16 is a flowchart showing an example of processing executed by the image processing unit according to a moire reconstruction method.

In contrast, FIG. 16 is a flowchart showing an example of processing executed by the image processing unit 107 according to the moire reconstruction method.

First, the image processing unit 107 acquires the complex sensor images output from the fringe scan processing unit 106. The image processing unit 107 generates the pattern 801 for reconstruction for use in processing for reconstruction and then multiplies the complex sensor images by the pattern 801 for reconstruction (1601), obtains a frequency spectrum through a two-dimensional FFT operation (1602), and extracts data in a required frequency domain of the frequency spectrum (1603). The subsequent processing is executed in the same manner as the processing 1504 to the processing 1506 in FIG. 15. Then, the image processing executed by the image processing unit 107 according to the moire reconstruction method comes to an end.

<Shooting Principle for Object at Finite Distance>

Figure 17:
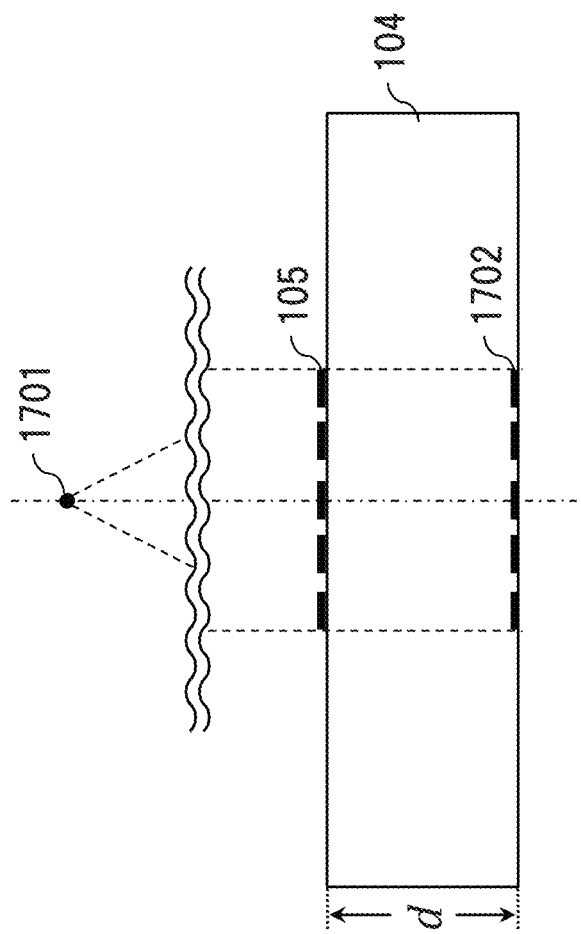
FIG. 17 is a diagram for explaining the projection of a real pattern in the case of an object at infinity.

FIG. 17 is a diagram for explaining the projection of the real pattern 105 in the case of an object at infinity. FIG. 17 shows the projection of the real pattern 105 to the image sensor 103 in the case of the thus described subject in the distance. The spherical wave from a point 1701 constituting an object in the distance turns into a plane wave while propagating over a sufficiently long distance, the plane wave irradiates the real pattern 105, and in a case in which the shadow 1702 is projected to the image sensor 103, the shadow has almost the same phase as the real pattern 105. As a result, the shadow 1702 is subjected to the processing for reconstruction with the use of the pattern for reconstruction, thereby making it possible to obtain a single bright spot.

Figure 18:
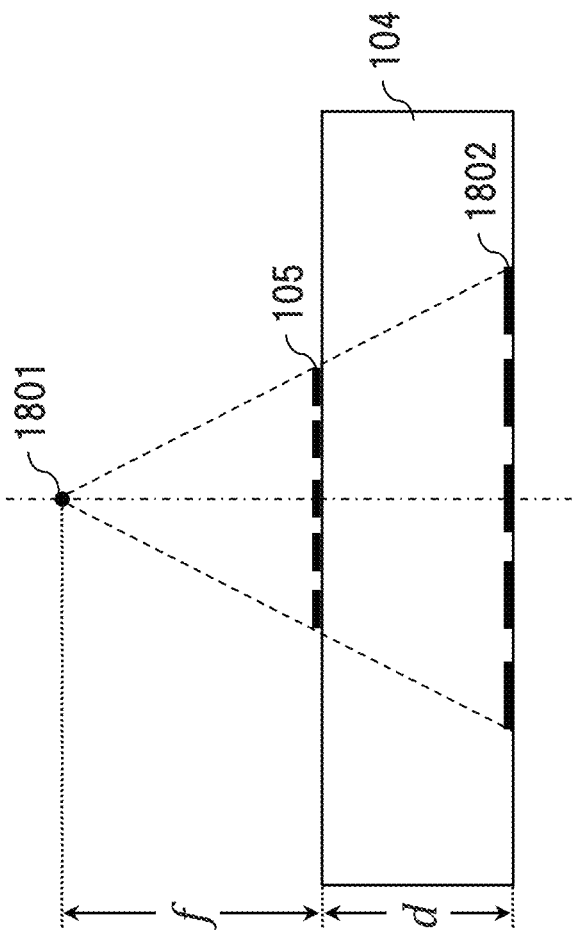
FIG. 18 is a diagram for explaining the enlargement of a real pattern in the case of an object at a finite distance.

On the other hand, imaging of an object at a finite distance will be described. FIG. 18 is a diagram for explaining the enlargement of the real pattern 105 in the case of an object at a finite distance. The spherical wave from a point 1801 constituting the object irradiates the real pattern 105, and in a case in which the shadow 1802 is projected to the image sensor 103, the shadow is enlarged in an almost uniform manner. Further, the enlargement factor α can be calculated as follows with the use of the distance f from the real pattern 105 to the point 1801:

[Mathematical Formula 16]

$$\alpha = \frac{f+d}{f} \quad (16)$$

Therefore, the processing for reconstruction directly with the use of the pattern for reconstruction, designed for parallel light, fails to obtain a single bright spot. As long as the pattern 801 for reconstruction is enlarged in accordance with the uniformly enlarged shadow of the real pattern 105, a single bright spot can be obtained again with respect to the enlarged shadow 1802. To this end, it is possible to perform a correction by adjusting the coefficient β for the pattern 801 for reconstruction to β/α². Thus, light from the point 1801 at a distance which is not always infinite can be selectively reproduced. Accordingly, shooting can be performed while focusing on any position.

Figure 19:
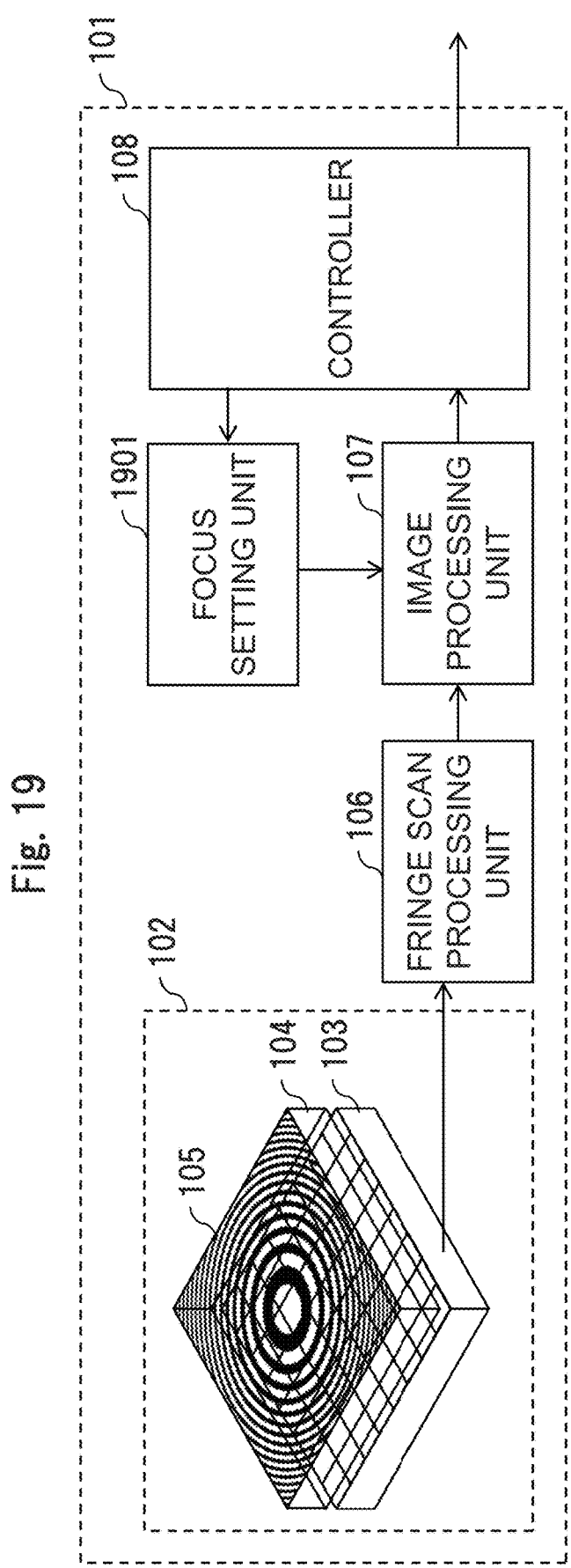
FIG. 19 is a diagram illustrating a configuration example of an imaging device that has a focusing function.

Furthermore, the present configuration also makes it possible to achieve focusing at any distance after shooting. FIG. 19 is a diagram illustrating a configuration example of the imaging device 101 that has a focusing function. Unlike FIG. 1, the imaging device 101 includes a focus setting unit 1901. The focus setting unit 1901, which is capable of acquiring, through the controller 108, a focusing distance that is input by operating a hardware switch, such as a knob provided in the imaging device 101, or a GUI (Graphical User Interface) outputs the focusing distance information to the image processing unit 107. The focus setting unit 1901 may be achieved in the controller 108.

Furthermore, the fact that the focus adjustment is possible after shooting as just described means that depth information is included, thereby making it possible to achieve various functions such as auto focus and ranging in the image processing unit 107. For achieving such functions including the focus adjustment, there is a need to freely change the coefficient β for the pattern 801 for reconstruction. However, the fringe scan operation is performed with the use of only the sensor images, as in the processing in the fringe scan processing unit 106 described in the present embodiment, thereby making it possible to independently execute image processing with the use of the pattern 801 for reconstruction, and thus simplify the processing. More specifically, in attempting to make the focus adjustment or the like after imaging, the operation quantity can be significantly reduced, without performing any fringe scan again in the image processing unit, and because of the operation with the pattern for reconstruction for the complex sensor images.

The method and configuration according to the present embodiment make it possible to achieve an imaging device which is capable of executing the image processing of focus adjustment, auto focus, and ranging after imaging separately from the fringe scan processing. More specifically, in attempting to make the focus adjustment or the like after imaging, the operation quantity can be significantly reduced, without performing any fringe scan again in the image processing unit, and because of the operation with the pattern for reconstruction for the complex sensor images.

Second Embodiment

There is a possibility that the imaging device 101 according to the first embodiment will, because its higher functions such as focus adjustment, auto focus, and ranging, slow down the processing executed by the image processing unit 107, and furthermore, increase the size, cost, and power consumption of the imaging device 101. Therefore, in the second embodiment, a processing divide method for reducing at least one of the processing, size, cost, power consumption, and the like of the imaging device 101 will be described. Hereinafter, a difference from the first embodiment will be mainly described.

Figure 20:
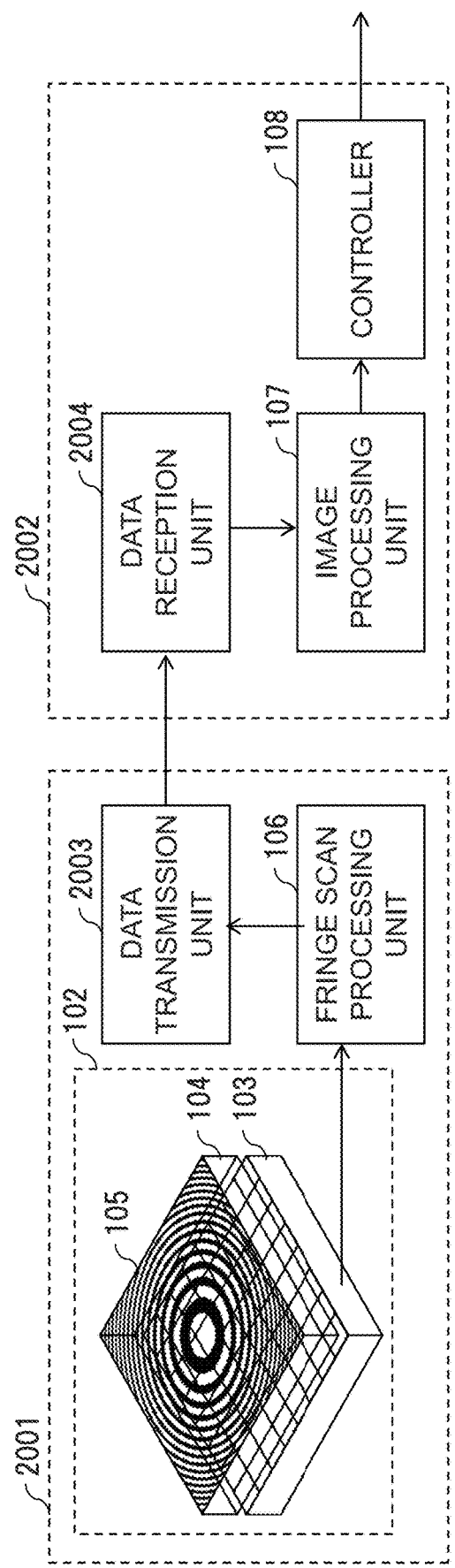
FIG. 20 is a diagram illustrating a configuration example of an imaging system according to a second embodiment.

FIG. 20 is a diagram illustrating a configuration example of an imaging system according to the second embodiment. The imaging system is obtained by dividing the imaging device 101 according to the first embodiment into an imaging device 2001 that is a transmitting device and an image processing device 2002 that is a receiving device. In the present imaging system, the imaging device 2001 and the image processing device 2002 transmit and receive data via a wire communication means, a wireless communication means, or a combination thereof, or via a storage medium. The communication means can be composed of, for example, a combination of one or more of various communication networks such as a LAN (Local Area Network) and the Internet. In this case, the image processing device 2002 can be achieved with, for example, a server computer, and this server computer may be capable of communicating with a plurality of imaging devices 2001.

The imaging device 2001 includes a data transmission unit 2003 in addition to an imaging unit 102 and a fringe scan processing unit 106. The data transmission unit 2003 converts a complex sensor image output by the fringe scan processing unit 106, into a format that is transmitted to a predetermined communication network or storage medium, and transmits the image in the format thereto. The data transmission unit 2003 may be, for example, an interface that meets the communications standard of a wire or wireless LAN, may be an interface that meets the communications standard of a mobile communication network, or may be an interface that meets the communications standard of a USB (Universal Serial Bus) or the like. The imaging device 2001 may include a plurality of data transmission units 2003 for different communications standards, which may be used differently depending on the communication environment.

The image processing device 2002 includes a data reception unit 2004 in addition to an image processing unit 107 and a controller 108. The data reception unit 2004 receives data (complex sensor image) transmitted from the imaging device 2001, converts the data into a predetermined format that is handled by the image processing unit 107, and outputs the data in the format thereto. The data reception unit 2004 serves as an interface that is similar to the data transmission unit 2003 described above. The image processing unit 107 achieves functions such as focus adjustment, auto focus, and ranging, with the use of the complex sensor image output from the data reception unit 2004.

The method and configuration according to the present embodiment transmits the sensor image to the external device, thereby making it possible to simplify the configuration of the imaging device 2002, and thus achieve a reduction in size, a reduction in weight, and a low cost. In addition, the transmission of the complex sensor image subjected to the fringe scan operation to the external device allows the achievement of higher functions such as focus adjustment, auto focus, and ranging, for example, in the image processing device 2002 which operates at a higher speed than the imaging device 2001.

Third Embodiment

The imaging system according to the second embodiment has a large amount of data in the communication between the imaging device 2001 and the image processing device 2002, and there is a possibility of increasing the transmission band and power consumption required for the communication. Therefore, in the third embodiment, a data amount reduction method for reducing the amount of data in the communication will be described. Hereinafter, a difference from the second embodiment will be mainly described.

Figure 21:
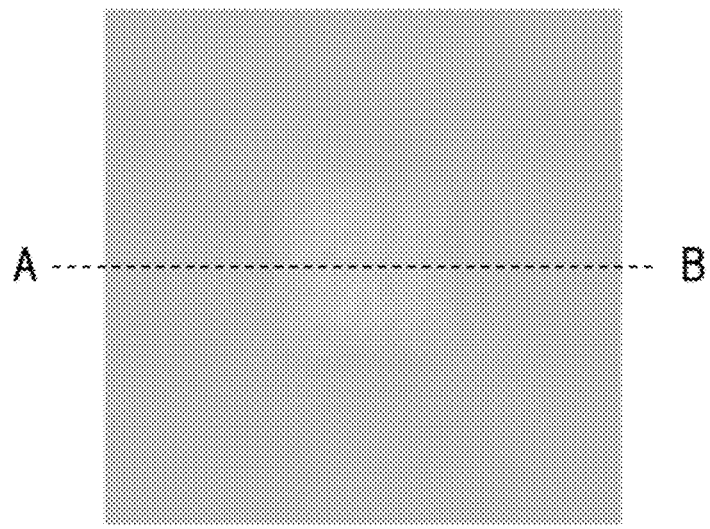
FIG. 21 is a diagram illustrating an example of a sensor image.
Figure 22:
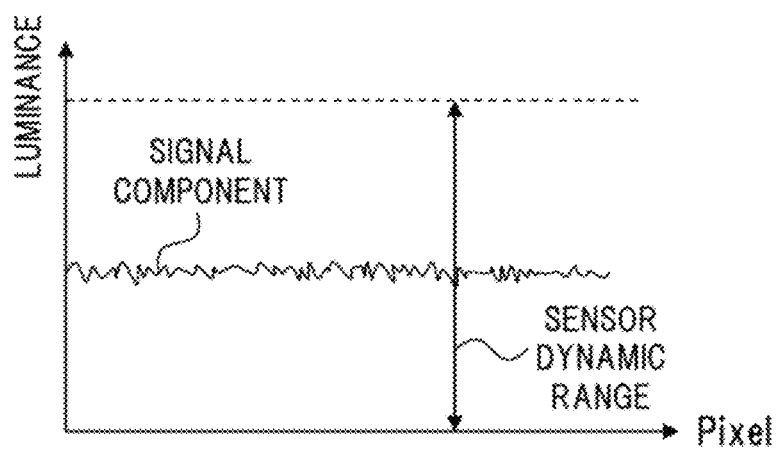
FIG. 22 is a diagram illustrating a luminance distribution example of the sensor image.

First, a method for reducing the data amount of a sensor image will be mentioned. FIG. 21 shows an example of a sensor image that is an output from the image sensor 103 in the case of taking a shot of a subject. FIG. 22 is a diagram illustrating a luminance distribution example of the sensor image, which shows the result of mapping the luminance at the position of each pixel on the straight line connecting A with B in FIG. 21. As in the figure, the sensor image has a signal component concentrated near the center of range with respect to the sensor dynamic range, and can be thus considered as a format which is easily subjected to data compression. Specifically, it is possible to reduce the data amount in such a way that the required bit rate is reduced (for example, significant bits are reduced) by extracting only the data in the range between the maximum value and minimum value of the signal component, and reducing the other data.

Figure 23:
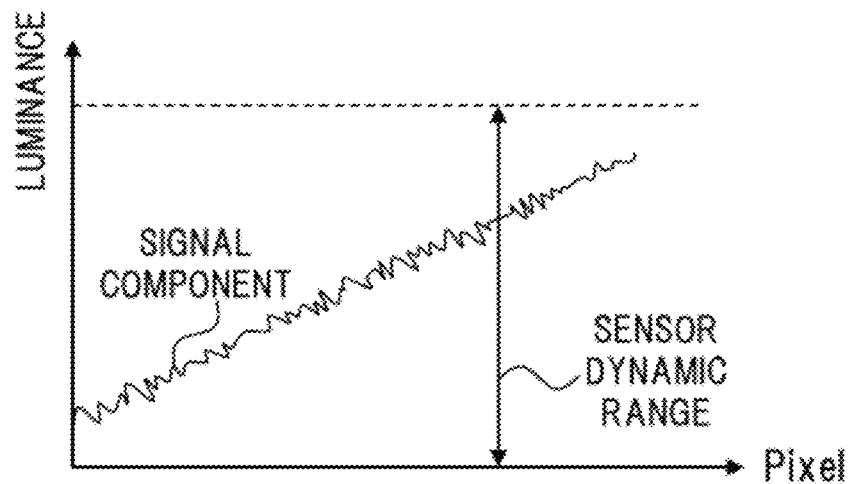
FIG. 23 is a diagram illustrating another luminance distribution example of the sensor image.

However, depending on the condition for shooting, as shown in FIG. 23 (a diagram illustrating another luminance distribution example of the sensor image), luminance unevenness may be caused on the sensor, thereby distributing the signal component over the entire sensor dynamic range, and in this case, the data will be reduced insufficiently.

Figure 24:
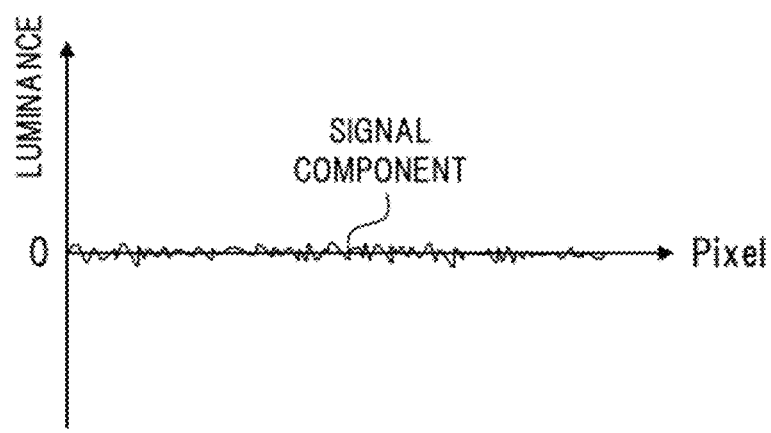
FIG. 24 is a diagram illustrating a luminance distribution example of a complex sensor image.

Therefore, the fringe scan operation in the fringe scan processing unit 106 is effective. For example, the fringe scan with the use of the four phases as shown in FIG. 12 uses the phases of $\Phi=0$, $\pi/2$, $\pi$, and $3\pi/2$, where the phases that have a relationship of a phase difference $\pi$, such as $\Phi=0$ and $\pi$ as well as $\Phi=\pi/2$ and $3\pi/2$, have patterns with transmission and non-transmission inverted. More specifically, because of the inverted patterns with the same luminance unevenness, the subtraction between the sensor images that have the foregoing relationship makes it possible to remove the luminance unevenness, thereby providing a signal component with an average value of substantially 0, as shown in FIG. 24 (a diagram illustrating a luminance distribution example of the complex sensor image). Thus, it is possible to limit the data such that the signal component consistently falls within a predetermined range, and it is possible to efficiently execute the data amount reduction processing. It is to be noted that the subtraction results between $\Phi=0$ and $\pi$ as well as $\Phi=\pi/2$ and $3\pi/2$ refer to real parts and imaginary parts of the complex sensor images which are outputs form the fringe scan processing unit 106, as can be seen from the formula (10).

Figure 25:
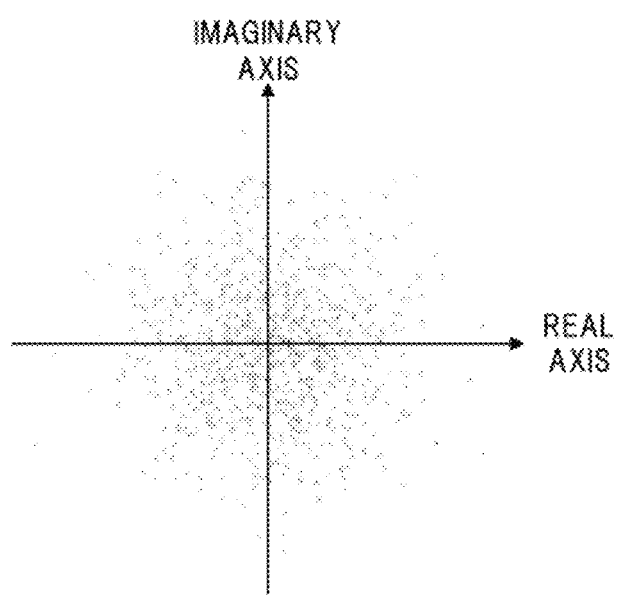
FIG. 25 is a diagram showing a data example of a complex sensor image in a complex space.
Figure 26:
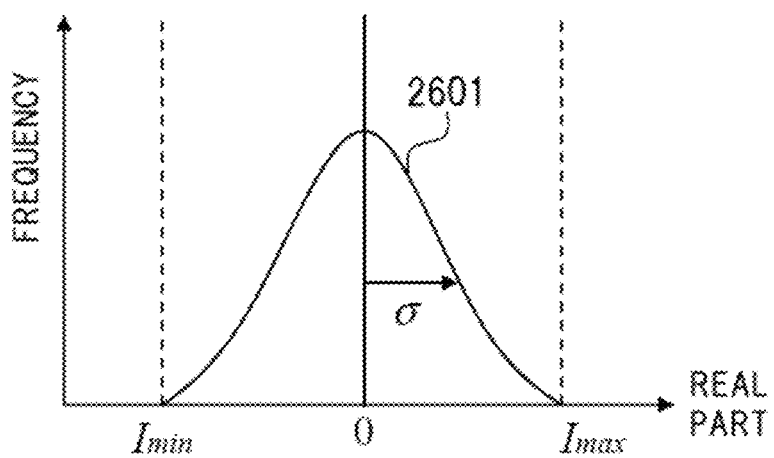
FIG. 26 is a diagram illustrating a histogram example of real part data of the complex sensor image.

Next, a method for reducing the data amounts of the complex sensor images will be described in detail. FIG. 25 shows an example of mapping data of a complex sensor image on a complex space. As in the figure, the complex sensor image subjected to the fringe scan operation is distributed on the complex space. FIG. 26 shows a histogram example of real part data of the complex sensor image. It is enough to output, through the calculation of the maximum value ($I_{max}$) and minimum value ($I_{min}$) of the distribution 2601, only the real part data in the range. The same applies to imaginary part data of the complex sensor image.

It is to be noted that in view of the sensor image also including therein pulsed noise, there is a possibility of failing to reduce the amount of data sufficiently just by outputting the data in the range between the maximum value and the minimum value. In addition, according to the present embodiment, the data after the reconstruction is believed to be spread over the entire surface of the sensor, and even the lack of some data of the sensor image thus has no significant influence on the quality after the reconstruction. Therefore, a method of avoiding the output of all distributed data may be adopted, such as the output of data in the range within the standard deviation $\sigma$ of the distribution, or the output of data in the range of $3\sigma$, with 0 as a center in the distribution 2601 of FIG. 26. This method is capable of further reducing the amount of data.

In addition, the output data may be limited to a preset range or a preset degree of precision, rather than the maximum value and the minimum value, or the standard deviation as mentioned above. For example, in the case of limiting the data to a present range, there are methods such as outputting data as 8 bits with the most significant to fifth most significant bits consistently reduced in a case in which the bit rate of the complex sensor image is 13 bits. In addition, in the case of limiting the data to a preset degree of precision, there are methods such as outputting data as 8 bits with least significant to fifth least significant bits consistently reduced or subjected to rounding in a case in which the bit rate of the complex sensor image is 13 bits. The foregoing methods eliminate the need to calculate the maximum value, the minimum value, the standard deviation, or the like, thereby making it possible to reduce the operation quantity.

In addition, in the case of moving image processing, as for the above-mentioned maximum value, minimum value, and standard deviation, and the like, the range or degree of precision may be determined with the use of the result for a frame processed before a frame in processing, thereby limiting the output data. This limitation makes it possible to reduce the influence of a delay in arithmetic processing, and efficiently execute the data amount reduction.

Figure 27:
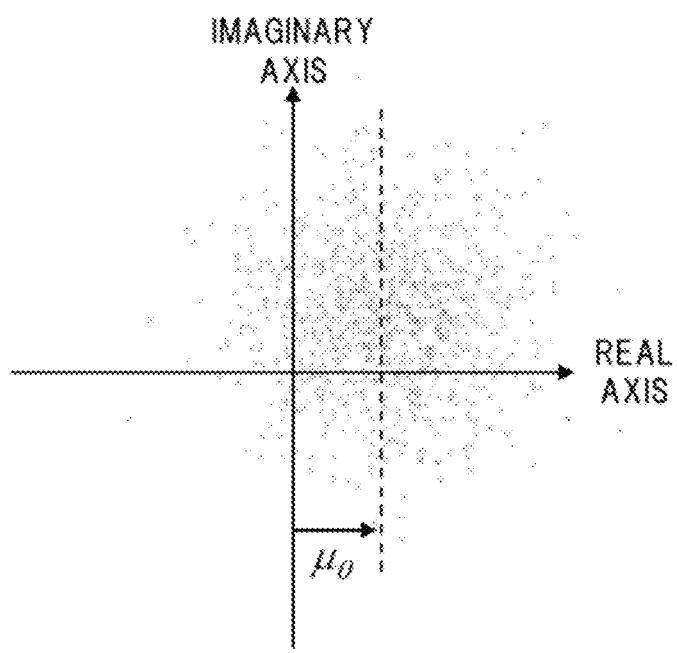
FIG. 27 is a diagram showing another data example of a complex sensor image in a complex space.
Figure 28:
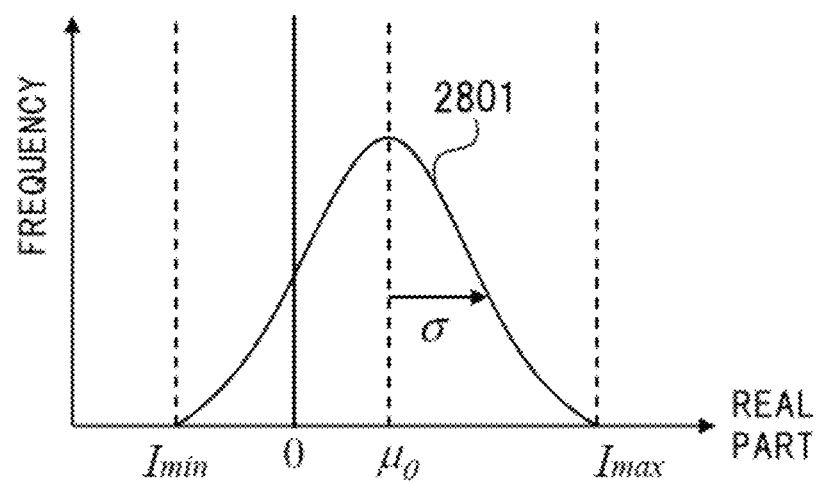
FIG. 28 is a diagram illustrating another histogram example of real part data of the complex sensor image.

FIG. 27 is another example of mapping data of a complex sensor image on a complex space. FIG. 28 shows a histogram example of real part data of the complex sensor image. As in the figure, there is also possibility that the average value $\mu 0$ of the distribution 2801 is not 0. In this case, the data may be output after subtracting $\mu 0$ from the data. According to the present embodiment, the image processing unit 107 executes processing for reconstruction, mainly including Fourier transform, and the luminance offset thus has no direct influence on the reconstructed image. If there is any influence, there is a possibility of having a peak as a direct-current component of a frequency spectrum according to the moire reconstruction method, but it is possible to solve the influence by means such as masking the pixels in question.

Figure 29:
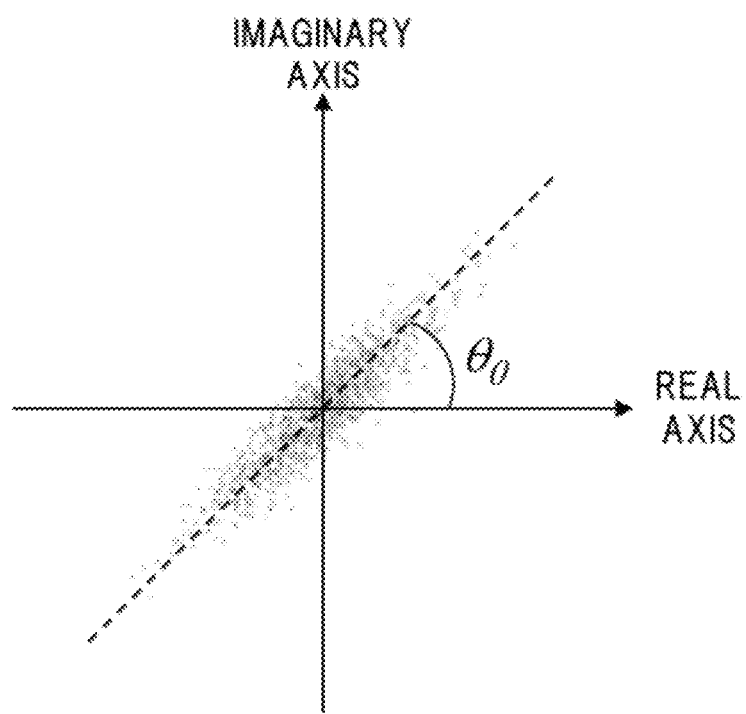
FIG. 29 is a diagram showing yet another data example of a complex sensor image in a complex space.
Figure 30:
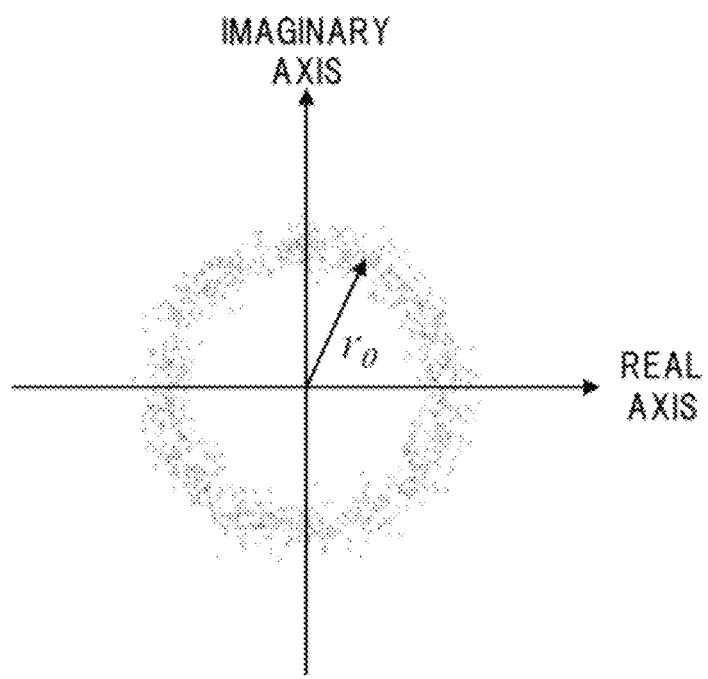
FIG. 30 is a diagram showing yet another data example of a complex sensor image in a complex space.

In addition, while FIGS. 25 and 27 show examples of having an isotropic distribution in the complex space, the distribution may be biased in some cases as shown in FIGS. 29 and 30, depending on the shooting conditions. FIGS. 29 and 30 each show yet another example of mapping data of a complex sensor image on a complex space. In the anisotropic distribution as shown in FIG. 29, the output data may be limited in different ranges between the real part and the imaginary part in a case in which the average value $\theta_0$ for argument is 0, whereas it is effective to apply a polar coordinate transformation to the complex sensor image in a case in which the average value $\theta_0$ for argument is not 0. After the polar coordinate transformation, through the multiplication by the argument $(-\theta_0)$, the output data may be limited in different ranges between the real part and the imaginary part. Alternatively, amplification and phase data of polar coordinates may be output through the limitation of the range and precision of the phase data of the complex sensor image. Likewise, also in the circular distribution as shown in FIG. 30, it is effective to apply a polar coordinate transformation to the complex sensor image. Amplification and phase data of polar coordinates may be output through the limitation on the range and precision of the amplification data with the average value $r_0$ for the amplification of the complex sensor image as a center.

Furthermore, in a case in which the distribution is extremely biased as shown in FIG. 29, a method may be adopted which outputs only data on either the real part or the imaginary part, or either the amplification or the phase. This method makes it possible to significantly reduce the data amount.

Figure 31:
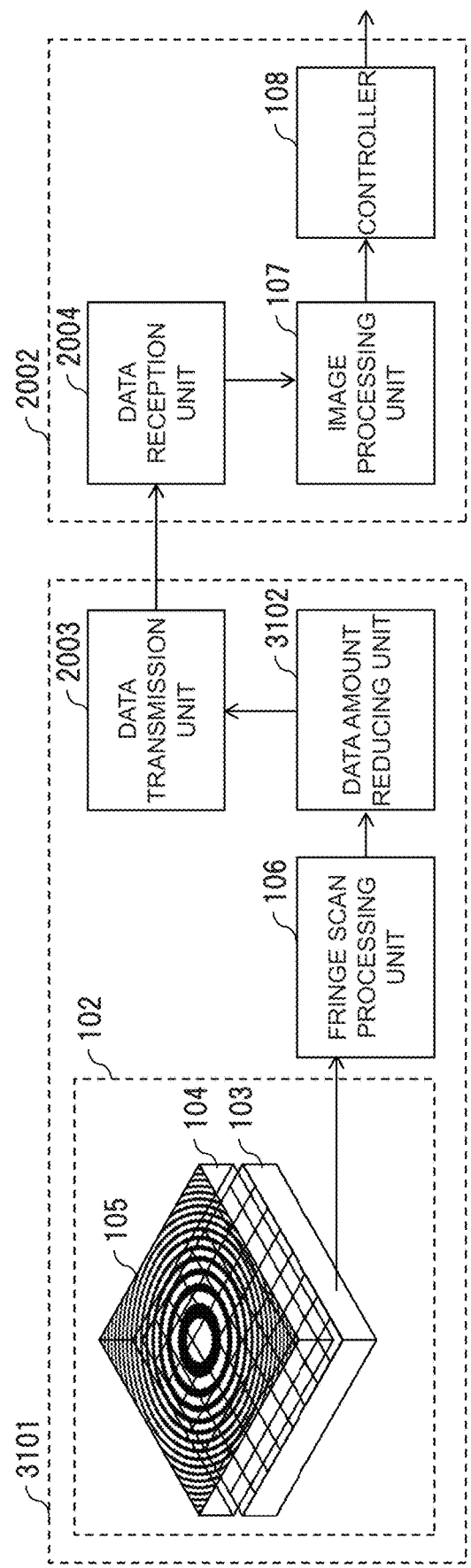
FIG. 31 is a diagram illustrating a configuration example of an imaging system according to a third embodiment.

A configuration for executing the foregoing data reduction processing will be described. FIG. 31 is a diagram illustrating a configuration example of an imaging system according to the third embodiment. The difference from the imaging system (FIG. 20) according to the second embodiment is an imaging device 3101 in place of the imaging device 2001. The imaging device 3101 includes a data amount reducing unit 3102, unlike the imaging device 2001. In the imaging device 3101, a fringe scan processing unit 106 outputs a complex sensor image, the data amount reducing unit 3102 reduces the amount of data by means such as reducing the bit rate of the complex sensor image, and a data transmission unit 2003 transmits the complex sensor image with the reduced amount of data to an external device.

Figure 32:
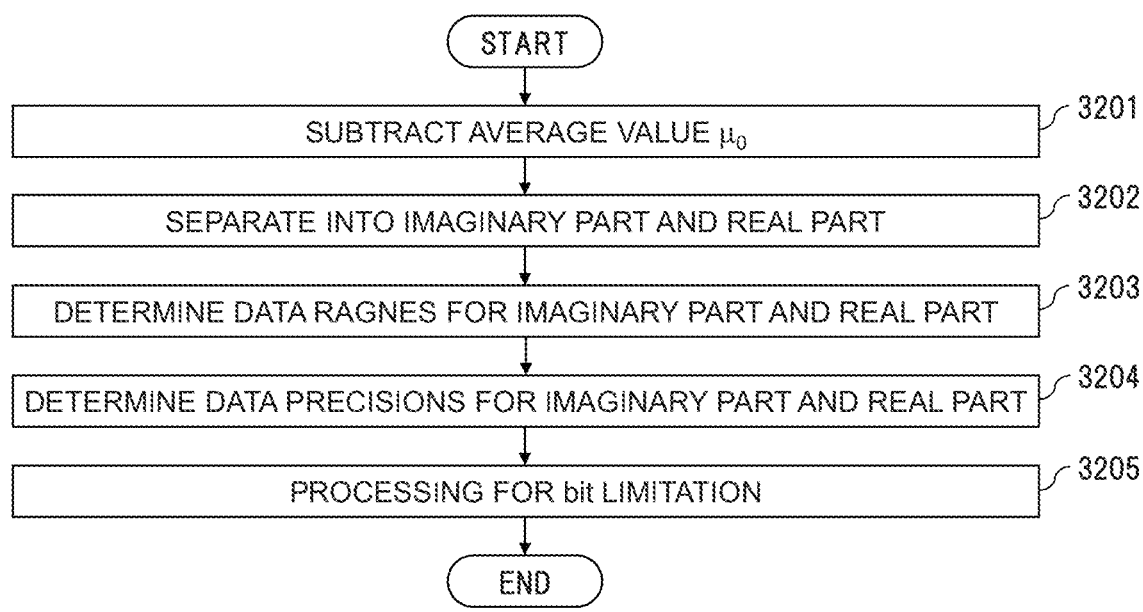
FIG. 32 is a flowchart showing an example of processing executed by a data amount reducing unit.

FIG. 32 is a flow chart showing an example of processing executed by the data amount reducing unit 3102. First, the data amount reducing unit 3102 acquires a complex sensor image output from the fringe scan processing unit 106, and subtracts the average value µ0 in a case in which the average value µ0 is not 0 (3201). Next, the data amount reducing unit 3102 separates the complex sensor image into an imaginary part and a real part (3202). Subsequently, the data amount reducing unit 3102 determines the output data range by means such as obtaining the maximum value and the minimum value, for each of the imaginary part and the real part (3203), determines the bit precision required for the range (3204), and then limits the bit rate of the output data in accordance with the determined range and precision, and output the data (3205).

Figure 33:
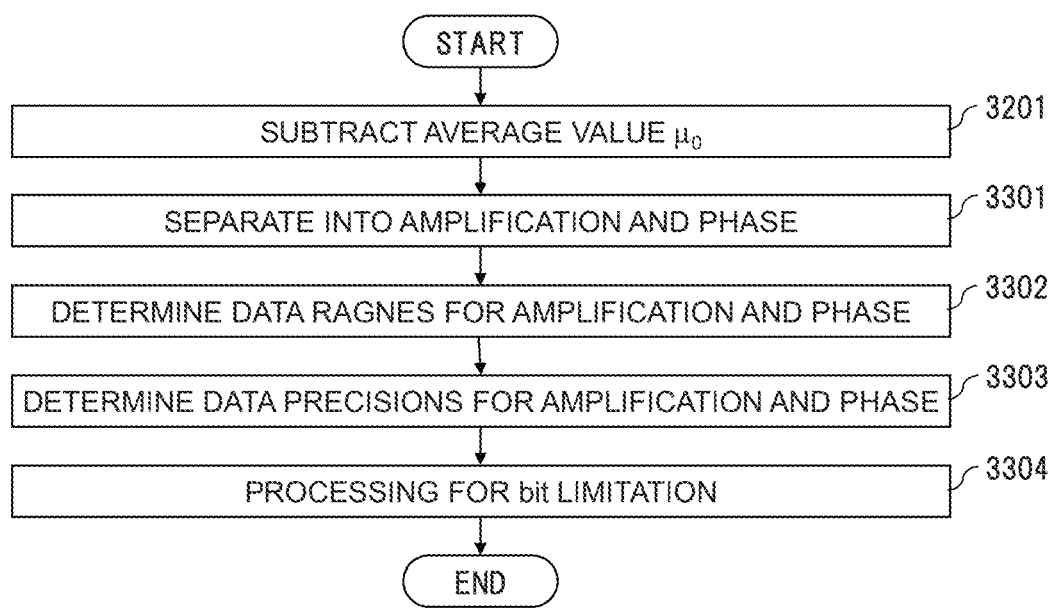
FIG. 33 is a flowchart showing another example of processing executed by the data amount reducing unit.

FIG. 33 is a flow chart showing another example of processing executed by the data amount reducing unit 3102. It is in output after polar coordinate transformation that FIG. 33 differs from the processing in FIG. 32. First, the data amount reducing unit 3102 acquires a complex sensor image output from the fringe scan processing unit 106, and subtracts the average value µ0 in a case in which the average value µ0 is not 0 (3201). Next, the data amount reducing unit 3102 transforms the complex sensor image into polar coordinates, and then separates the coordinates into amplifications and phases (3301). Subsequently, the data amount reducing unit 3102 determines the output data range by means such as obtaining the maximum value and the minimum value, for each of the amplifications and the phases (3302), determines the bit precision required for the range (3303), and then limits the bit rate of the output data in accordance with the determined range and precision, and output the data (3304). This processing makes it possible to increase the data reducing efficiency in a case in which the distribution is anisotropic in the complex space.

Figure 34:
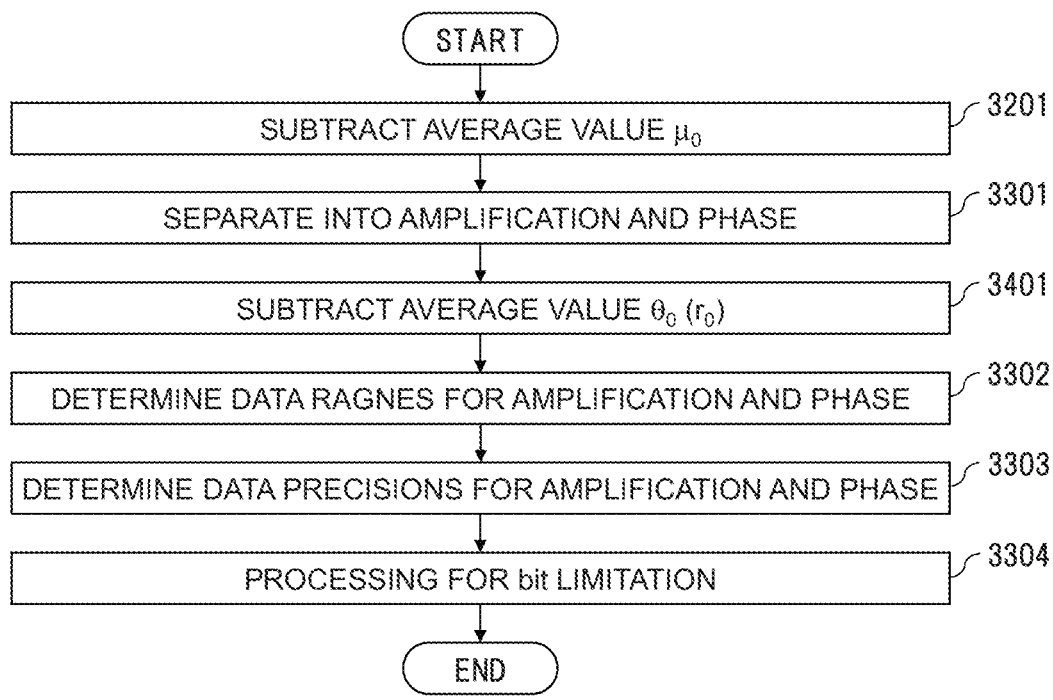
FIG. 34 is a flowchart showing yet another example of processing executed by the data amount reducing unit.

FIG. 34 is a flow chart showing yet another example of processing executed by the data amount reducing unit 3102. The flowchart of FIG. 34 differs from FIG. 33 in that processing 3401 is added between the processing 3301 and the processing 3302. The data amount reducing unit 3102 subtracts, from the separated amplification and phase data, the phase average value $\theta_0$ and the amplification average value $r_0$ depending on the distribution profile (3401). This processing makes it possible to execute the data reduction in a further efficient manner.

The method and configuration according to the present embodiment reduce the bit rate of sensor image data, thereby making it possible to reduce the data traffic, and then reduce the transmission band and power consumption for network transmission.

The present invention has been described above with reference to the multiple embodiments. Obviously, the present invention is not to be considered limited to the embodiments mentioned above, but considered to encompass various modification examples. For example, the embodiment mentioned above have been described in detail for clearly explaining the present invention, but are not necessarily to be considered limited to the inclusion of all of the configurations described.

In addition, it is possible to replace a part of a configuration according to an embodiment with a configuration according to another embodiment, and it is also possible to add a configuration according to an embodiment to a configuration according to another embodiment. In addition, it is possible to add/remove/substitute another configuration to/from/for a part of the configuration according to each embodiment.

In addition, the respective configurations, functions, processing units, processing means, etc. mentioned above may be partially or entirely achieved with hardware, for example, by designing with integrated circuits. In addition, the respective configurations, functions, etc. mentioned above may be achieved with software in a way that a processor interprets and executes programs for achieving the respective functions. Information such as programs, tables, and files for achieving the respective functions can be stored on recording devices such as memories, hard disks, SSD (Solid State Drive), or recording media such as IC cards, SD cards, and DVDs (Digital Versatile Disc).

In addition, the control lines and information lines are shown which are considered required for the sake of explanation, but all of the control lines and information lines required for a product are not always shown. In fact, it is conceivable that almost all of the configurations are interconnected.

The present invention is not limited to the imaging device, the imaging method, and the image processing device, but can be provided in various aspects such as an imaging system, an image processing method, and a computer-readable program.

What is claimed is:

1. An imaging device comprising;
a modulator configured to modulate an intensity of light, based on a grating pattern;
an image sensor configured to convert light passing through the modulator to electrical signals to generate a sensor image;
a complex sensor image processing unit configured to generate, from the sensor image, a complex sensor image comprising a complex number; and
a data transmission unit configured to transmit the complex sensor image,
wherein the complex sensor image processing unit generates the complex sensor image, based on the following formula:

$$I_{CF}(x) = \frac{1}{2}\sum_{\Phi} I_F(x) \cdot \exp(i\Phi).$$

2. The imaging device according to claim 1, comprising:
a data amount reducing unit configured to reduce a data amount of the complex sensor image.

3. The imaging device according to claim 2,
wherein the data amount reducing unit separates the complex sensor image into a real part and an imaginary part to reduce the data amount.

4. The imaging device according to claim 2,
wherein the data amount reducing unit separates the complex sensor image into an amplification and a phase to reduce the data amount.

5. The imaging device according to claim 2,
wherein the data amount reducing unit determines, based on a maximum value and a minimum value for the complex sensor image, a data range and precision to reduce an output bit rate.

6. The imaging device according to claim 2,
wherein the data amount reducing unit determines, based on a distribution standard deviation for the complex sensor image, a data range and precision to reduce an output bit rate.

7. An image processing device configured to communicate with an imaging device,
wherein the imaging device comprises a modulator configured to modulate an intensity of light, based on a first grating pattern, an image sensor configured to convert light passing through the modulator to electrical signals to generate a sensor image, a complex sensor image processing unit configured to generate, from the sensor image, a complex sensor image comprising a complex number, and a data transmission unit configured to transmit the complex sensor image, and
the image processing device comprises:
a data reception unit configured to receive the complex sensor image; and
an image processing unit configured to restore an image, based on an operation with the complex sensor image and data of a second grating pattern,
wherein the complex sensor image processing unit generates the complex sensor image, based on the following formula $$I_{CF}(x) = \frac{1}{2}\sum_{\Phi} I_F(x) \cdot \exp(i\Phi).$$

8. The image processing device according to claim 7,
wherein the imaging device comprises a data amount reducing unit configured to reduce a data amount of the complex sensor image.

9. The image processing device according to claim 8,
wherein the data amount reducing unit separates the complex sensor image into a real part and an imaginary part to reduce the data amount.

10. The image processing device according to claim 8,
wherein the data amount reducing unit separates the complex sensor image into an amplification and a phase to reduce the data amount.

11. The image processing device according to claim 8,
wherein the data amount reducing unit determines, based on a maximum value and a minimum value for the complex sensor image, a data range and precision to reduce an output bit rate.

12. The image processing device according to claim 8,
wherein the data amount reducing unit determines, based on a distribution standard deviation for the complex sensor image, a data range and precision to reduce an output bit rate.

13. An imaging device comprising:
a modulator configured to modulate an intensity of light, based on a first grating pattern;
an image sensor configured to convert light passing through the modulator to electrical signals to generate a sensor image;
a complex sensor image processing unit configured to generate, from the sensor image, a complex sensor image comprising a complex number; and
an image processing unit configured to restore an image, based on an operation with the complex sensor image and data of a second grating pattern,
wherein the complex sensor image processing unit generates the complex sensor image, based on the following formula $$I_{CF}(x) = \frac{1}{2}\sum_{\Phi} I_F(x) \cdot \exp(i\Phi).$$

14. An imaging method comprising:
a modulating step of modulating an intensity of light, based on a first grating pattern;
an image generating step of converting the modulated light to electrical signals to generate a sensor image;
a complex sensor image processing step of generating, from the sensor image, a complex sensor image comprising a complex number; and
a data transmitting step of transmitting the complex sensor image,
wherein based on the following formula, the complex sensor image is generated in the complex sensor image processing step $$I_{CF}(x) = \frac{1}{2}\sum_{\Phi} I_F(x) \cdot \exp(i\Phi).$$

15. The imaging method according to claim 14, comprising:
an image processing step of restore an image, based on an operation with the complex sensor image and data of a second grating pattern.

* * * * *